United States Patent
Sedky et al.

(10) Patent No.: US 7,526,504 B2
(45) Date of Patent: Apr. 28, 2009

(54) SPOOLING STRATEGIES USING STRUCTURED JOB INFORMATION

(75) Inventors: Khaled S. Sedky, Sammamish, WA (US); Harvinder Pal Singh, Redmond, WA (US); Feng Yue, Sammamish, WA (US); Adina M. Trufinescu, Redmond, WA (US); Oliver H. Foehr, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/831,278

(22) Filed: Jul. 31, 2007

(65) Prior Publication Data

US 2008/0021923 A1 Jan. 24, 2008

Related U.S. Application Data

(63) Continuation of application No. 10/949,003, filed on Sep. 24, 2004.

(60) Provisional application No. 60/568,071, filed on May 3, 2004, provisional application No. 60/567,679, filed on May 3, 2004, provisional application No. 60/567,663, filed on May 3, 2004, provisional application No. 60/567,890, filed on May 3, 2004, provisional application No. 60/567,830, filed on May 3, 2004, provisional application No. 60/567,920, filed on May 3, 2004.

(51) Int. Cl.
*G06F 17/00* (2006.01)
(52) U.S. Cl. .................. 707/103 R; 715/200; 358/1.1
(58) Field of Classification Search ............ 707/100, 707/103 R; 715/200, 243; 358/1.1, 1.12, 358/1.13, 1.16, 1.18
See application file for complete search history.

(56) References Cited

U.S. PATENT DOCUMENTS 4,410,286 A 10/1983 Ko et al.

(Continued)

OTHER PUBLICATIONS

Reguero et al, "Large Scale Print Spool Service", published in the Proceedings of the Twelfth Systems Administration Conference (LISA '98) Boston, Massachusetts, Dec. 6-11, 1998. pp. 1-15. Downloaded: http://citeseerx.ist.psu.edu/viewdoc/summary?doi=10.1.1.107.7406.*

(Continued)

*Primary Examiner*—Shahid A Alam
*Assistant Examiner*—Hares Jami
(74) *Attorney, Agent, or Firm*—Lee & Hayes, PLLC

(57) ABSTRACT

Spooling strategies are described for producing job information that conforms to a hierarchical structure, and then storing the job information in a spool storage. The job information is then retrieved from the spool storage and consumed. The structured job information includes a multi-level hierarchy of nodes, including a job level that represents the entire job, a document level that represents a document to be processed within the job; a rendition level that represents a rendition of the document to be processed; and a page level that represents a page associated with the rendition. The hierarchical structure can also include resource nodes and metadata nodes associated with any level of the hierarchy, respectively representing resources and metadata. The hierarchy can optionally be composed using one or more selection and sequence parts. Program logic implements the production and consumption of the job information by providing a collection of logic modules for selectively adding and retrieving elements to the hierarchically structure. The program logic also provides logic for enumerating the contents of the job information and for signaling the occurrence of various events associated with the processing of the job information.

15 Claims, 10 Drawing Sheets

U.S. PATENT DOCUMENTS

| | | | |
|---|---|---|---|
| 4,594,674 A | 6/1986 | Boulia et al. |
| 4,649,513 A | 3/1987 | Martin et al. |
| 4,870,611 A | 9/1989 | Martin et al. |
| 5,179,702 A | 1/1993 | Spix et al. |
| 5,222,205 A | 6/1993 | Larson et al. |
| 5,469,532 A | 11/1995 | Gerlach et al. |
| 5,469,533 A | 11/1995 | Dennis |
| 5,487,138 A | 1/1996 | Rust et al. |
| 5,537,526 A | 7/1996 | Anderson et al. |
| 5,613,124 A | 3/1997 | Atkinson et al. |
| 5,699,493 A | 12/1997 | Davidson, Jr. et al. |
| 5,727,220 A | 3/1998 | Hohensee et al. |
| 5,745,121 A | 4/1998 | Politis |
| 5,745,122 A | 4/1998 | Gay et al. |
| 5,745,910 A | 4/1998 | Piersol et al. |
| 5,752,055 A | 5/1998 | Redpath et al. |
| 5,752,056 A | 5/1998 | Celik |
| 5,806,078 A | 9/1998 | Hug et al. |
| 5,819,295 A | 10/1998 | Nakagawa et al. |
| 5,845,058 A | 12/1998 | Shaw et al. |
| 5,903,903 A | 5/1999 | Kennedy |
| 5,905,504 A | 5/1999 | Barkans et al. |
| 5,911,138 A | 6/1999 | Li et al. |
| 5,940,581 A | 8/1999 | Lipton |
| 5,950,215 A | 9/1999 | Tabuchi |
| 5,960,168 A | 9/1999 | Shaw et al. |
| 5,993,088 A | 11/1999 | Nogay et al. |
| 6,026,416 A | 2/2000 | Kanerva et al. |
| 6,070,175 A | 5/2000 | Mezei |
| 6,094,665 A | 7/2000 | Lyons et al. |
| 6,134,552 A | 10/2000 | Fritz et al. |
| 6,138,162 A | 10/2000 | Pistriotto et al. |
| 6,144,974 A | 11/2000 | Gartland |
| 6,173,295 B1 | 1/2001 | Goertz et al. |
| 6,182,080 B1 | 1/2001 | Clements |
| 6,182,096 B1 | 1/2001 | Mastie et al. |
| 6,195,676 B1 | 2/2001 | Spix et al. |
| 6,199,082 B1 | 3/2001 | Ferrel et al. |
| 6,212,530 B1 | 4/2001 | Kadlec |
| 6,247,018 B1 | 6/2001 | Rheaume |
| 6,247,066 B1 | 6/2001 | Tanaka |
| 6,269,403 B1 | 7/2001 | Anders |
| 6,344,855 B1 | 2/2002 | Fisher et al. |
| 6,362,870 B2 | 3/2002 | Mui et al. |
| 6,385,727 B1 | 5/2002 | Cassagnol et al. |
| 6,407,821 B1 | 6/2002 | Hohensee et al. |
| 6,418,448 B1 | 7/2002 | Sarkar |
| 6,427,230 B1 | 7/2002 | Goiffon et al. |
| 6,447,184 B2 | 9/2002 | Kimura et al. |
| 6,449,653 B2 | 9/2002 | Klemets et al. |
| 6,457,017 B2 | 9/2002 | Watkins et al. |
| 6,466,935 B1 | 10/2002 | Stuart |
| 6,480,206 B2 | 11/2002 | Prinzing |
| 6,507,858 B1 | 1/2003 | Kanerva et al. |
| 6,538,760 B1 | 3/2003 | deBry et al. |
| 6,549,918 B1 | 4/2003 | Probert, Jr. et al. |
| 6,571,279 B1 | 5/2003 | Herz et al. |
| 6,583,789 B1 | 6/2003 | Carlson et al. |
| 6,591,278 B1 | 7/2003 | Ernst |
| 6,604,144 B1 | 8/2003 | Anders |
| 6,608,693 B1 | 8/2003 | Lloyd et al. |
| 6,609,200 B2 | 8/2003 | Anderson et al. |
| 6,615,281 B1 | 9/2003 | Temple, III |
| 6,654,147 B1 | 11/2003 | Ramot |
| 6,657,647 B1 | 12/2003 | Bright |
| 6,658,477 B1 | 12/2003 | Lisitsa et al. |
| 6,674,540 B1 | 1/2004 | Wiechers et al. |
| 6,675,353 B1 | 1/2004 | Friedman |
| 6,675,356 B1 | 1/2004 | Adler et al. |
| 6,681,223 B1 | 1/2004 | Sundaresan |
| 6,715,126 B1 | 3/2004 | Chang et al. |
| 6,763,343 B1 | 7/2004 | Brooke et al. |
| 6,771,291 B1 | 8/2004 | DiStefano, III |
| 6,781,609 B1 | 8/2004 | Barker et al. |
| 6,789,229 B1 | 9/2004 | Dunietz et al. |
| 6,812,941 B1 | 11/2004 | Brown et al. |
| 6,826,626 B1 | 11/2004 | McManus |
| 6,867,874 B1 | 3/2005 | Shima |
| 6,891,632 B2 | 5/2005 | Schwartz |
| 6,910,843 B2 | 6/2005 | Saw et al. |
| 6,917,976 B1 | 7/2005 | Slaughter et al. |
| 6,925,597 B2 | 8/2005 | Anwar |
| 6,925,631 B2 | 8/2005 | Golden |
| 6,944,515 B2 | 9/2005 | Nakajima et al. |
| 6,952,801 B2 | 10/2005 | Warmus et al. |
| 6,968,557 B1 | 11/2005 | Zhang et al. |
| 6,992,785 B2 | 1/2006 | Chatcavage et al. |
| 7,017,162 B2 | 3/2006 | Smith et al. |
| 7,027,660 B2 | 4/2006 | Hersch et al. |
| 7,043,688 B1 * | 5/2006 | Tsutsumi et al. ............ 715/255 |
| 7,047,237 B2 | 5/2006 | Suzuki et al. |
| 7,051,276 B1 | 5/2006 | Mogilevsky et al. |
| 7,051,330 B1 | 5/2006 | Kaler et al. |
| 7,092,963 B2 | 8/2006 | Ryan et al. |
| 7,106,275 B2 | 9/2006 | Brunner et al. |
| 7,131,060 B1 | 10/2006 | Azuma |
| 7,134,071 B2 | 11/2006 | Ohwada et al. |
| 7,162,538 B1 | 1/2007 | Cordova |
| 7,171,471 B1 | 1/2007 | Nair |
| 7,181,731 B2 | 2/2007 | Pace et al. |
| 7,209,921 B2 | 4/2007 | Pace et al. |
| 7,271,935 B2 | 9/2007 | Coons et al. |
| 7,274,483 B2 | 9/2007 | Aiyama et al. |
| 7,302,634 B2 | 11/2007 | Lucovsky et al. |
| 7,359,902 B2 | 4/2008 | Ornstein et al. |
| 7,426,525 B2 | 9/2008 | Sayers et al. |
| 2001/0003828 A1 | 6/2001 | Peterson et al. |
| 2001/0013043 A1 | 8/2001 | Wagner |
| 2001/0018697 A1 | 8/2001 | Kunitake et al. |
| 2001/0043358 A1 | 11/2001 | Schwartz |
| 2001/0044809 A1 | 11/2001 | Parasnis et al. |
| 2002/0002667 A1 | 1/2002 | Kelsey et al. |
| 2002/0049790 A1 | 4/2002 | Ricker et al. |
| 2002/0065848 A1 | 5/2002 | Walker et al. |
| 2002/0073236 A1 | 6/2002 | Helgeson et al. |
| 2002/0087602 A1 | 7/2002 | Masuda et al. |
| 2002/0089691 A1 | 7/2002 | Fertlitsch et al. |
| 2002/0099797 A1 | 7/2002 | Merrell et al. |
| 2002/0107886 A1 | 8/2002 | Gentner et al. |
| 2002/0111133 A1 | 8/2002 | Wittkotter |
| 2002/0174145 A1 | 11/2002 | Duga et al. |
| 2002/0188638 A1 | 12/2002 | Hamscher |
| 2003/0009672 A1 * | 1/2003 | Goodman .................... 716/176 |
| 2003/0018694 A1 | 1/2003 | Chen et al. |
| 2003/0028560 A1 | 2/2003 | Kudrolli et al. |
| 2003/0050932 A1 | 3/2003 | Pace et al. |
| 2003/0079181 A1 | 4/2003 | Schumacher et al. |
| 2003/0093520 A1 | 5/2003 | Beesley |
| 2003/0126136 A1 | 7/2003 | Omoigui |
| 2003/0137539 A1 | 7/2003 | Dees |
| 2003/0149934 A1 | 8/2003 | Worden |
| 2003/0158851 A1 | 8/2003 | Britton et al. |
| 2003/0163552 A1 | 8/2003 | Savitzky et al. |
| 2003/0163589 A1 | 8/2003 | Bunce et al. |
| 2003/0167356 A1 | 9/2003 | Smith et al. |
| 2003/0172168 A1 | 9/2003 | Mak et al. |
| 2003/0182152 A1 | 9/2003 | Nakajima et al. |
| 2003/0182311 A1 | 9/2003 | Nakajima et al. |
| 2003/0182450 A1 | 9/2003 | Ong et al. |
| 2003/0182656 A1 | 9/2003 | Leathers et al. |
| 2003/0187534 A1 | 10/2003 | Suzuki et al. |
| 2003/0187612 A1 | 10/2003 | Miyake |
| 2003/0187870 A1 | 10/2003 | Nakajima et al. |
| 2003/0195784 A1 | 10/2003 | Smith |

| | | |
|---|---|---|
| 2003/0229845 A1 | 12/2003 | Salesin et al. |
| 2003/0233420 A1 | 12/2003 | Stark et al. |
| 2004/0003388 A1 | 1/2004 | Jacquemot et al. |
| 2004/0003448 A1 | 1/2004 | Morrow et al. |
| 2004/0021905 A1 | 2/2004 | Holmstead et al. |
| 2004/0032611 A1 | 2/2004 | Daly et al. |
| 2004/0034848 A1 | 2/2004 | Moore et al. |
| 2004/0049737 A1 | 3/2004 | Simon Hunt et al. |
| 2004/0054669 A1 | 3/2004 | Seyrat et al. |
| 2004/0061729 A1 | 4/2004 | Green et al. |
| 2004/0066527 A1 | 4/2004 | Kloosterman et al. |
| 2004/0078755 A1 | 4/2004 | Shinjo et al. |
| 2004/0103073 A1 | 5/2004 | Blake et al. |
| 2004/0111418 A1* | 6/2004 | Nguyen et al. ............. 707/100 |
| 2004/0117733 A1 | 6/2004 | Moreau et al. |
| 2004/0130741 A1* | 7/2004 | Ferlitsch .................. 358/1.13 |
| 2004/0139049 A1 | 7/2004 | Hancock et al. |
| 2004/0153467 A1 | 8/2004 | Conover et al. |
| 2004/0160613 A1* | 8/2004 | Kurotsu et al. .............. 358/1.1 |
| 2004/0183837 A1 | 9/2004 | Watanabe et al. |
| 2004/0194025 A1 | 9/2004 | Hubert et al. |
| 2004/0205623 A1 | 10/2004 | Weil et al. |
| 2004/0205653 A1 | 10/2004 | Hadfield et al. |
| 2004/0207869 A1 | 10/2004 | Endo |
| 2004/0216048 A1 | 10/2004 | Brown et al. |
| 2004/0225960 A1 | 11/2004 | Parikh et al. |
| 2004/0267553 A1 | 12/2004 | Brunton |
| 2004/0268304 A1 | 12/2004 | Kuo et al. |
| 2005/0005233 A1 | 1/2005 | Kays et al. |
| 2005/0015767 A1 | 1/2005 | Nash et al. |
| 2005/0071385 A1 | 3/2005 | Rao |
| 2005/0086030 A1 | 4/2005 | Zeidman |
| 2005/0091574 A1 | 4/2005 | Maaniitty et al. |
| 2005/0099398 A1 | 5/2005 | Garside et al. |
| 2005/0125720 A1 | 6/2005 | Little et al. |
| 2005/0132279 A1 | 6/2005 | Relyea et al. |
| 2005/0144556 A1 | 6/2005 | Petersen et al. |
| 2005/0190186 A1 | 9/2005 | Klassen |
| 2005/0198069 A1 | 9/2005 | Cherry et al. |
| 2005/0210026 A1 | 9/2005 | Wood |
| 2005/0210227 A1* | 9/2005 | Emerson et al. ................ 713/1 |
| 2005/0223312 A1 | 10/2005 | Erdtmann et al. |
| 2005/0251742 A1 | 11/2005 | Mogilevsky et al. |
| 2005/0278616 A1 | 12/2005 | Eller |
| 2005/0278626 A1 | 12/2005 | Malik |
| 2005/0286063 A1 | 12/2005 | Owen et al. |
| 2006/0031749 A1 | 2/2006 | Schramm et al. |
| 2006/0041838 A1 | 2/2006 | Khan |
| 2006/0047743 A1 | 3/2006 | Yuan et al. |
| 2006/0056334 A1 | 3/2006 | Yuan et al. |
| 2006/0080316 A1 | 4/2006 | Gilmore et al. |
| 2006/0117019 A1 | 6/2006 | Sylthe et al. |
| 2006/0117268 A1 | 6/2006 | Talley et al. |
| 2006/0136827 A1 | 6/2006 | Villaron et al. |
| 2006/0146353 A1 | 7/2006 | Yue et al. |
| 2006/0155529 A1 | 7/2006 | Ludviksson et al. |
| 2006/0206794 A1 | 9/2006 | Ornstein et al. |
| 2008/0021923 A1 | 1/2008 | Sedky et al. |

OTHER PUBLICATIONS

Ashcraft et al., "SPOOLES: An object-oriented sparse matrix library", In Proceedings of the 9th SIAM Conference on Parallel Processing for Scientific Computing, 1999. pp. 1-10. Downloaded: http://citeseerx.ist.psu.edu/viewdoc/summary?doi=10.1.1.44.5809.*

"Adobe Photoshop release history", Wikipedia, Oct. 28, 2008, pp. 1-7.

Akerlof, "The Market for "Lemons": Quality Uncertainty and the Market Mechanism", Quarterly Journal of Economics, vol. 84, Issue 3, Aug. 1970, pp. 488-500.

Devanur, et al., "An Improved Approximation Scheme for Computing Arrow-Debreu Prices for the Linear Case", retrieved on Nov. 10, 2008 at <<http://www.cc.gatech.edu/~nikhil/pubs/fsttcs.pdf>>, pp. 1-8.

Geanakoplos, et al., "The Arrow-Debreu Model of General Equilibrium", retrieved on Nov. 10, 2008 at <<cowles.econ.yale.edu>>, Cowles Foundation for Research in Economics at Yale University, 2004.

Jain, et al., "A Polynomial Time Algorithm for Computing an Arrow-Debreu Market Equilibrium for Linear Utilities", Proceedings of the 45th Annual IEEE Symposium on Foundations of Computer Science (FOCS '04), IEEE, 2004, pp. 1-9.

Jain, et al., "Approximating Market Equilibria", Springerlink, LNCS 2764, 2003, pp. 1-11.

Levy, et al., "Non-Distorted Texture Mapping for Sheared Triangulated Meshes", The 25th Conference on Computer Graphics and Interactive Techniques, ACM, 1998, pp. 343-352.

Shade, et al., "Layered Depth Images", The 25th Annual Conference on Computer Graphics and Interactive Techniques, ACM, 1998, pp. 231-242.

"Supported File Formats Photoshop Elements 5.0", retrieved at <<http://www.adobe.com/cfusion/knowledgebase/index.cfm?id=330350>>, Sep. 5, 2007, pp. 1-6.

"Windows NT 4.0", Wikipedia, Nov. 6, 2008, pp. 1-9.

"Windows NT Server Printing", retrieved on Nov. 17, 2008 at <<http://www.microsoft.com/resources/documentation/windowsnt/4/server/reskit/en-us/resg...>>, 2008, pp. 1-35.

Jacobs, et al., "Adaptive Grid-Based Document Layout", ACM, 2003, pp. 838-847.

"Apache Server Frequently Asked Questions", Apache HTTP Server Version 1,3, <<http://httpd.apache.org/docs/misc/FAQ.html>>, 35 pages.

Bluethman, et al., "Interleaved Graphics and Text", IBM Technical Bulletin, Apr. 1980, vol. 22, No. 4, Oct. 1986, pp. 4813-4815.

Chien, et al., "Effcient Schemes for Managing Multiversion XML Documents", University of California, California, Dec. 19, 2002, pp. 332-353.

Christodoulakis, et al., "Multimedia Document Presentation, Information Extraction, and Document Formation in MINOS: A Model and a System", ACM Transaction on Office Information Systems, vol. 4, No. 4, Oct. 1989, pp. 345-383.

"Controlling the Data Chaos by Adding the Intelligence to Media", 2004, 4 pages.

El-Kwae, et al., "Document Image Representation Using XML Technologies", Proceedings of SPIE, vol. 4670, 2001, pp. 109-120.

Ellis et al., "Postscrip, Bezier Curves and Chinese Character", ACM, 1989, pp. 162-165.

Girardot, et al., "Efficient Representation and Streaming XML Content Over the Internet Medium", IEEE 2000, pp. 67-70.

Han, et al., "WebSplitter:A Unified XML Framework for Multi-Device Collaborative web browsing" IBM Thomas J. Watson research Centre, Hawthorne, CSCW, Dec. 2-6, 2000, ACM, 1-58113-222-0/00/0012, pp. 221-230.

Hardy, et al., "Mapping and Displaying Structural Transformations between XML and PDF", ACM, 2002, pp. 95-102.

Holman, "What is XSL-FO", Google, Mar. 20, 2002, pp. 1-4.

Marco, et al., "A Framework for Designing and Implementing the Ada Standard Container Library", ACM 2003, pp. 49-61.

Miller, "An Introduction to the Resource Description Framework", D-Lib Magazine, available at <<http://www.dlib.org/dlib/may98/miller/05miller.html>>, May 1998, 10 pages.

Moschini, "@tryinCSS3 (was Useragent Rules in CSS)", available at <<http://lists.w3.org/Archives/Public/www-style/2004Mar/0333.html>>, Mar. 31, 2004, 2 pages.

"Networked File System", available at <<http://www.scit.wlv.ac.uk/~jphb/comms/nfs.html>>, 6 pages.

Open eBook Publication Structure 1.2, Open eBook Forum, Aug. 2002, pp. 1-93.

Orchard, et al., "Versioning XML Languages W3C Proposed TAG finding [Editorial Draft]", Nov. 16, 2003, pp. 1-23.

Orchard, David; "Versioning XML Vocabularies" published on XML.com Dec. 3, 2003, pp. 1-10.

Pawson, "Printing from XML: An Introduction to XSL-FO", Google, Oct. 9, 2002, pp. 1-4.

Peter et al., "CrystalWeb—A distributed authoring environment for the World-Wide Web" Computer Networks and ISDN Systems, North Holland Publishing. Amsterdam, NL. vol. 27, No. 6, Apr. 1995, pp. 861-870.

"SOAP Version 1.2 Part 1: Messaging Framework", W3C Proposed Recommendation, available at <<http://www.w3.org/TR/2003/PR-soap12-part1-20030507>>, May 7, 2003, 25 pages.

"SVG Print", W3C Working Draft, available at <<http://www.w3.org/TR/2003/WD-SVGPrint-20030715/>>, Jul. 15, 2003 pp. 1-14.

"URIQA! The URI Query Agent Model, A Semantic Web Enabler", URIQA: The Nokia Query Agent, available at <<http://sw.nokia.com/uriqa/URIQA.html>>, 2004, 9 pages.

"XMP Adding Intelligence to Media", XMP Specification, Jan. 2004, 11 pages.

"@tryinCSS3 (was Useragent Rules in CSS)"; Mar. 31, 2004; http://lists.w3.org/Archives/Public/www-style/2004Mar/0333.html.; 2 pages.

"[Editorial Draft] Versioning XML Languages"; Proposed TAG Finding Nov. 16, 2003; http://www.w3.org/2001/tag/doc/versioning-20031116; 23 pages.

"Apache Server Frequently Asked Questions"; Apache HTTP Server Version 1.3; http://httpd.apache.org/docs.misc/FAQ.html.; 35 pages.

"Controlling the Data Chaos by Adding Intelligence to Media"; 4 pages. 2004.

"Interleaved Graphics and Text" Bluethman et al., IBM Technical Disclosure Bulletin, Apr. 1980, vol. 22, No. 11., pp. 4813-4815.

"Networked File System"; http://www.scit.wlv.ac.uk/~jphb/comms/nfs.htm.; 6 pages.

"SOAP Version 1.2 Part 1: Messaging Framework"; W3C Proposed Recommendation May 7, 2003; http://www.w3.org/TR/2003/PR-soap12-part1-20030507. 25 pages.

"SVG Print", W3C Working Draft, Jul. 15, 2003 http://www.w3.org/TR/2003/WD-SVGPrint-20030715/ pp. 1-14.

"URIQA! The URI Query Agent Model, A Semantic Web Enabler"; URIQA: The Nokia Query Agent; http://sw.nokia.com/uriqa/URIQA.html.; 9 pages 2004.

"XMP Adding Intelligence to Media"; XMP Specification, Jan. 2004, 11 pages.

Bluethman, et al., "Interleaved Graphics in Text", IBM Technical Bulletin, Apr. 1980, vol. 22, No. 4, Oct. 1986, pp. 4813-4815.

Chien, et al., "Effcient Schemes for Managing Multiversion XML Documents", University of California, California, Dec. 19, 2002, pp. 332-353.

Christodoulakis, et al., "Multimedia Document Presentation, Information Extraction, and Document Formation in MINOS: A Model and a System", ACM Transaction on Office Information Systems, vol. 4, No. 4, Oct. 1986, pp. 345-383.

El-Kwae, et al., "Document Image Representation Using XML Technologies", Proceedings of SPIE, vol. 4670, 2001, pp. 109-120.

Ellis et al., "Postscrip, Bezier Curves and Chinese Character", ACM, 1989, pp. 162-165.

Girardot et al. "Efficient Representation and Streaming XML Content Over the Internet Medium"; IEEE 2000, pp. 67-70.

Han, et al., "WebSplitter:A Unified XML Framework for Multi-Device Collaborative web browsing" IBM Thomas J. Watson research Centre, Hawthorne, CSCW, Dec. 2-6, 2000, ACM 1-58113-222-0/00/0012, pp. 221-230.

Hardy, et al., "Mapping and Displaying Structural Transformations between XML and PDF", ACM, 2002, pp. 95-102.

Holman; "What is XSL-FO", Google Mar. 20, 2002, pp. 1-4.

Jacobs, et al., "Adaptive Grid-Based Documnet Layout", ACM, 2003, pp. 838-847.

Marco, et al., "A Framework for Designing and Implementing the Ada Standard Container Library", ACM 2003, pp. 49-61.

Miller, "An Introduction to the Resource Description Framework", D-Lib Magazine, available at <<http://www.dlib.org/dlib/may98/miller/05miller.html>>, May 1998, 10 pages.

Official Notice of Rejection for China Patent Application No. 200480001329.4, Dec. 18, 2007, pp. 1-16.

Open eBook Publication Structure 1.2, Open eBook Forum, Aug. 2002, pp. 1-93.

Orchard, David; "Versioning XML Vocabularies" published on XML.com Dec. 3, 2003, pp. 1-10.

Pawson, "Printing from XML: An Introduction to XSL-FO", Google, Oct. 9, 2002, pp. 1-4.

Peter et al., "CrystalWeb—A distributed authoring environment for the World-Wide Web" Computer Networks and ISDN Systems, North Holland Publishing. Amsterdam, NL. vol. 27, No. 6, Apr. 1995, pp. 861-870.

* cited by examiner

Example of Structured Job Information

SPOOLING STRATEGIES USING STRUCTURED JOB INFORMATION

This application is a continuation of U.S. application Ser. No. 10/949,003 (the '003 Application), filed on Sep. 24, 2004, having the same title and inventorship as the present application. The '003 application is incorporated by reference herein in its entirety. The '003 application, in turn, claims the benefit of the following U.S. Provisional Applications, all filed on May 3, 2004, and each of which is incorporated by reference herein in its respective entirety: U.S. Provisional Application No. 60/568,071; U.S. Provisional Application No. 60/567,679; U.S. Provisional Application No. 60/567,663; U.S. Provisional Application No. 60/567,890; U.S. Provisional Application No. 60/567,830; and U.S. Provisional Application No. 60/567,920.

CROSS-REFERENCE TO RELATED APPLICATIONS

The present application is also related to co-pending and commonly assigned U.S. patent application Ser. No. 10/794,669, entitled "Multi level Ticket-Based Job Management Architecture for Computing Devices," filed on Mar. 5, 2004, which is incorporated herein by reference in its entirety.

The present application is also related to co-pending and commonly assigned U.S. patent application Ser. No. 10/836,327, entitled "Document Mark Up Methods and Systems," filed on May 1, 2004, which is incorporated herein by reference in its entirety.

TECHNICAL FIELD

This subject matter relates to strategies for producing and consuming job information using spool storage, and, in another implementation, to a format and related interfaces used for producing and consuming job information.

BACKGROUND

Computing devices commonly render documents using spooling techniques (where "spool" is an acronym for Simultaneous Peripheral Operations On-Line). In a typical spooling technique, a device generates a document and stores it in a spool storage. The spool storage can be implemented using memory (such as RAM memory), or, more commonly, using disk storage. When the device is ready to process the document, the device can then access the document from the spool storage and convert it to a format that is compatible with the format expectations of an output device (such as a format defined by the Page Description Language). The device can then forward the converted document to the output device, whereupon the output device prints the document, or performs some other processing with respect to the document. Storing a document in a spool storage (rather than directly outputting the document to the printer) is generally advantageous because it allows the device to perform other tasks while the document is being processed for printing. Generally, a print job refers to the task of processing an identified document using a spooling strategy. The print job specifies job information to be processed by the spooling strategy.

Conventional strategies commonly generate and consume job information in a variety of proprietary and narrowly tailored formats. The lack of versatility, sophistication and uniformity in these formats can prevent the device from rendering job information in an efficient manner, especially for certain print scenarios to be described below. Known conventional strategies also do not provide techniques for processing job information in an asynchronous manner. Further, known conventional strategies do not provide versatile techniques for associating metadata with the job information. Known conventional strategies may suffer from yet additional unspecified deficiencies.

There is accordingly an exemplary need for more efficient strategies for producing and consuming documents using a spool storage.

SUMMARY

A method and associated logic are described for producing job information to be processed by a spooling module. The method comprises: (a) producing a data structure that specifies the job information, wherein the data structure defines a plurality of nodes organized into a hierarchical arrangement representing different aspects of the job information; and (b) storing the data structure in a spool storage for later retrieval and processing by the spooling module.

According to another exemplary aspect, the producing comprises: (a) producing at least one job node representing an entire job to be processed by the spooling module; (b) producing at least one document node representing a document to be processed, within the job, by the spooling module; (c) producing at least one rendition node representing a rendition of the document to be processed by the spooling module; and (d) producing at least one page node representing a page associated with the rendition to be processed by the spooling module.

According to another exemplary aspect, the job information is consumed from the spool storage, where the consuming comprises: (a) consuming the at least one job node; (b) consuming the at least one document node; (c) consuming the at least one rendition node; and (d) consuming the at least one page node.

According to another exemplary aspect, the producing and consuming are implemented using a plurality of object modules configured to produce and retrieve different nodes of the data structure, respectively.

According to another exemplary aspect, the consuming involves consuming the job information in a synchronous or asynchronous manner.

Additional exemplary implementations are described in the following.

Figure 1:
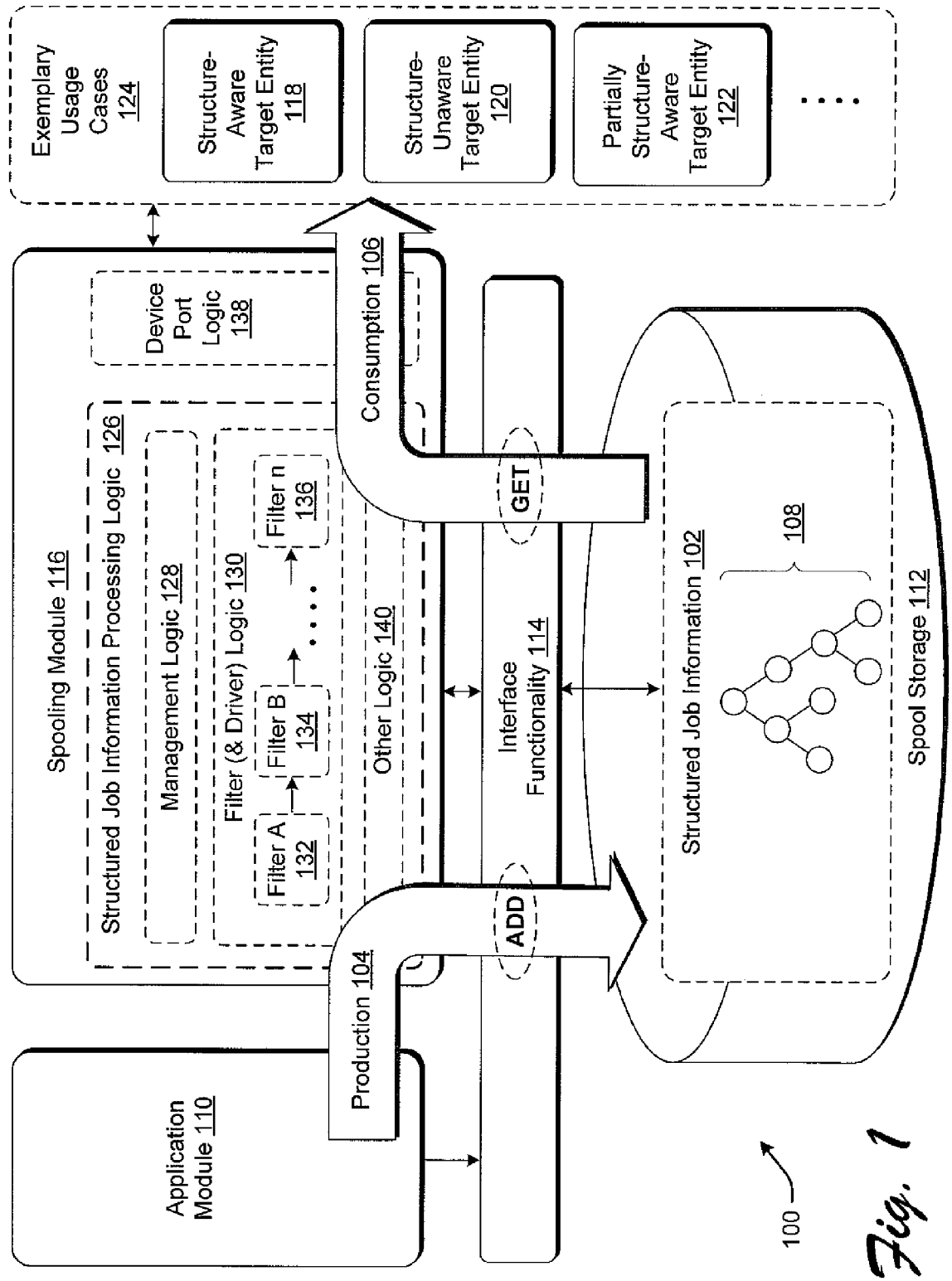
FIG. 1 shows an exemplary system for producing and consuming job information that conforms to a hierarchical structure, using spool storage.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth exemplary mechanisms for generating and consuming job information that conforms to a hierarchical structure. In a production phrase, the structured job information can be created and stored in a spool storage. In a consumption phase, the job information can then be retrieved from this storage for processing. A collection of application programming interface (API) classes facilitate the production and consumption of the job information. These API classes allow selective addition, retrieval and enumeration of targeted elements within the job information.

The term "job" used herein refers to a task in which one or more actions are performed to process job information. For instance, a print job may entail printing job information that defines one or more documents. More generally, reference to "processing" job information can refer to any kind of rendering of such job information, such as printing or displaying such job information. Alternatively, processing can refer to distributing the job information to a target destination (with or without modifying it), archiving the job information, or some other form of processing. The term "job information" refers to any kind of information used to specify the nature of the job, such as the actual information to be rendered, and/or information that defines how the job is to be rendered, and so on.

A "package" is a logical concept that refers to a collection of job information that comprehensively specifies an entire job. The package can contain multiple parts, also referred to as "elements" or "features" herein. In the case where the job information defines a hierarchical tree of nodes, such nodes may define respective elements in the package. Collections of elements can be treated as a single unit. For instance, a package may specify multiple collections that respectively define different renditions of a single document, and each of these collections can contain multiple elements (e.g., image resources, font resources, etc.).

The term "document" as used herein refers to any unit of any kind of information. For example, a document may pertain to information created by a text editing application, a spreadsheet processing program, a drawing program, and so on. Each document can have multiple associated parts, each of which can itself be considered a component document in its own right. A job can specify documents that originate from multiple different sources.

The term "rendition" refers to a version of a document. For example, one rendition of a document may correspond to a color version of the document, and another may correspond to a black and white version.

The term "spool storage" represents storage for storing job information implemented using any physical storage medium. In one case, a device may implement the spool storage using RAM memory. In another case, the device may implement the spool storage using disk storage, solid state memory, and so on. The spool storage can be fixed or removable. The spool storage may define a single file, a collection of associated files, or some other storage strategy. A unit of spool storage (such as a single file) that stores an entire package defining a job is also referred to as a "container." Alternatively, the spool storage can refer to transitory information transmitted via a communication channel and inherently retained by that channel during transport.

More generally, any of the functions described herein can be implemented using software, firmware (e.g., fixed logic circuitry), manual processing, or a combination of these implementations. The terms "module," "functionality," and "logic" as used herein generally represents software, firmware, or a combination of software and firmware. In the case of a software implementation, the terms "module," "functionality," or "logic" represent program code that performs specified tasks when executed on a processing device or devices (e.g., CPU or CPUs). The program code can be stored in one or more fixed and/or removable computer readable memory devices.

The above-mentioned processing device(s) can be implemented in different ways. For example, the processing device(s) can be implemented using semiconductor transistor-based computing mechanisms (e.g., by electronic integrated circuits (ICs) or fixed electronic logic circuitry). Alternatively, the processing device(s) can be implemented, in whole or in part, using quantum computing mechanisms, optical computing mechanisms, mechanical computing mechanisms, biological computing mechanisms, and so forth.

Certain examples in this disclosure are framed in the exemplary context of an object-oriented programming paradigm. By way of background, in such an approach, an application implements program modules as respective objects. Objects can include properties which convey attributes of the objects (e.g., the characteristics or traits of the objects). Objects can include methods associated therewith that provide functions that can be performed by the objects. Objects interact by passing messages to each other. The object-oriented programming paradigm commonly organizes objects in parent-child hierarchies. A child inherits the properties of its parent. A class refers to a general "blueprint" which describes a collection of objects. However, the principles described herein are not to be construed as limited to an object-oriented programming paradigm.

Finally, certain examples in this disclosure are framed in the exemplary context of a virtual programming environment. A virtual machine (VM) environment executes programs in a manner which is generally independent of the underlying complexities in the platform used to implement the execution. Microsoft Corporation's .NET Framework (provided by Microsoft Corporation of Redmond, Wash.) provides a virtual machine environment with its Common Language Runtime (CLR) functionality. More specifically, the .NET programming involves compiling source code using a compiler. The compiler produces an intermediate language (IL) code and metadata. In an execution phase, the .NET programming model uses a CLR loader and a just-in-time (JIT) compiler to transform the IL and metadata into native code. The native code constitutes the actual machine code that will run on an execution platform (e.g., a specific computing machine). The compilation process provided by the loader/JIT component is referred to as "just-in-time" because the compilation can take place just prior to the execution of the code. However, the principles described herein are not to be construed as limited to a virtual programming environment or the .NET programming environment; that is, the features of the spooling strategies described herein are platform-independent, meaning that they can be implemented on any commercial computing platform.

This disclosure includes the following sections. Section A describes an exemplary system for producing and consuming structured job information. Section B describes an exemplary flowchart which explains the operation of the system of Section A. Section C describes an exemplary computer environment for implementing the system of Section A. And the Appendix, Section D, describes exemplary application programming interface (API) functionality for use in the system of Section A.

A. Exemplary System

A.1. Overview of System

FIG. 1 shows an exemplary system 100 for producing and consuming job information 102. The production of such job information 102 is generally represented by arrow 104, and the consumption of such job information 102 is generally represented by arrow 106. The job information 102 includes a defined hierarchical structure 108.

This Section (i.e., Section A.1) provides an overview of the system 100 used to produce and consume the structured job information 102. The next Section (i.e., Section A.2) delves into greater detail regarding the organization of the job information 102 itself. Section A.3 then provides further information regarding the exemplary programming interfaces used to produce and consume the job information 102. Section A.4 describes an alternative technique for creating and consuming job information 102 using selector and sequence building blocks to provide a hierarchy of arbitrary depth.

By way of overview, the system 100 includes an application module 110 coupled to a spool storage 112 via interface functionality 114 (which can be implemented, in one example, as an application programming interface (API)). The spool storage 112 stores the job information 102. This chain of components implements the production aspects (104) of the processing of the job information 102. The system 100 also includes a spooling module 116 that is configured to retrieve the job information 102 from the spool storage 112 and then perform some kind of processing on it to provide an output result. This chain of components implements the consumption (106) aspects of the processing of the job information 102. As noted above, processing can refer to any kind of action performed on the job information 102, which may or may not modify the content of the job information 102. The processing may comprise printing the job information 102, displaying the job information 102, routing the job information 102 to a target location (with or without modifying it), archiving the job information 102, and so on. In any case, the recipient of the output result generated by the spooling module 116 can comprise one or more of the target entities (118, 120, 122, . . . ) associated with different usage cases 124. A variety of the usage cases 124 will be discussed below.

The modules, logic and storage units shown in the system 100 can be implemented by any variety and grouping of physical mechanisms and devices. In one exemplary case, a computing device (not shown) implements the application module 110, interface functionality 114, spool storage 112 and spooling module 116. More specifically, the various logic and modules (110, 112, 114, 116) can be implemented by machine readable code stored in the memory of the computing device and executed by the processing unit(s) of the computing device. The spool storage 112 can be implemented by a storage medium (e.g., a hard disk) provided by the computing device. The computing device can operate using any kind of platform (e.g., as defined by the operating system and/or other software configuration of the computing device). More specifically, in one implementation, the functionality and associated formats to be described below are specifically configured to operate using different computing platforms, thus defining a standard approach that has wide applicability to different technical environments and which thus serves to facilitate interaction among different technical environments and associated users.

In one case, the target entities (118, 120, 122, . . . ) can be implemented as devices that are separate from the computing device which implements the other components (110-116) of the system 100. The computing device can be communicatively coupled to the target entities (118, 120, 122, . . . ) via any kind of communication channel, such as USB coupling, parallel coupling, network coupling of any kind, manual transport of removable media, and so forth. In a common case, for instance, one or more of the target entities (118, 120, 122, . . . ) can comprise printers for printing documents fed to them by the spooling module 116. The computing device can be communicatively coupled to the printer(s) via any kind of hardwired and/or wireless links using any kind of communication protocol. Or the spool storage 112 can be implemented as a removable media and transported to the printer. The target entities (118, 120, 122) can alternatively represent display devices, storage devices, other computing devices, and so on.

The above allocation of system 100 functions to devices is only exemplary. In other implementations, different aspects of the system 100 can be implemented by separate computing devices. For instance, a first computing device can implement the application module 110 and a separate computing device can implement the spooling module 116. In other implementations, the spool storage 112 can also be implemented as a separate unit which couples to the computing device which implements the application module 110 and/or the spooling module 116. In other implementations, the target entities (118, 120, 122, . . . ) can be integrated into the same computing device which implements the application module 110 and/or the spool module 116. Still other configurations are possible.

Figure 10:
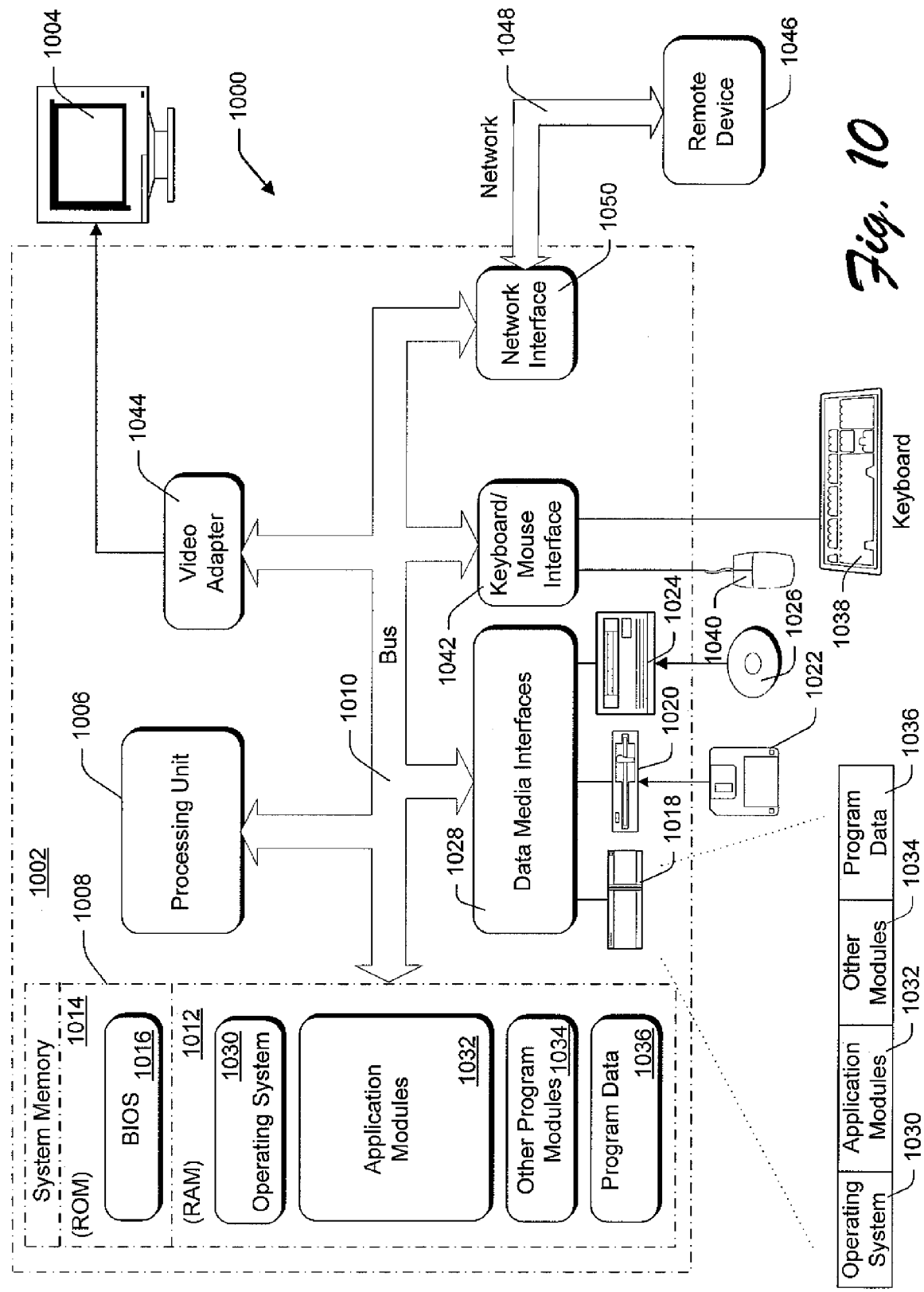
FIG. 10 shows an exemplary computing environment for implementing aspects of the system shown in FIG. 1.

In any event, where one or more computing devices are used to perform aspects of the system 100, those computing devices can correspond to any type of computing devices (e.g., general purpose computing devices, application-specific computing devices (e.g., game consoles such as Xbox™ game consoles produced by Microsoft Corporation of Redmond, Wash.), portable computing devices (such as a personal digital assistants, mobile phones, etc.), and so on. FIG. 10, to be discussed below in turn, shows one exemplary computer environment for implementing aspects of the system 100.

Further details regarding each of the above-identified components of the system 100 will follow. Beginning with the production aspect (104) of the system 100, the system 100 can use any kind of application module 110 to generate any kind of document. Common types of application modules 110 include text processing programs, spreadsheet processing programs, graphics processing programs, markup language processing programs, database search and retrieval programs, and so on. There is no constraint on the type of application program that can be used to supply job information 102 to be processed using the system 100. The application module 110 can represent a program implemented in any programming environment; for example, the application module 110 can be implemented as a managed program within the Microsoft Corporation's .NET programming environment.

The interface functionality 114 formats the output of the application module 110 into the structure 108 of the job information 102. Generally, exemplary and non-limiting functions performed by the application functionality 114 can include: (1) persisting the job information 102 in the spool storage 112 having the desired structure 108; (2) submitting job information 102 to the spooling module 116 for scheduling and printing; (3) monitoring different stages of the job production and hooking up to back end notifications to inform any interested listening entities; (4) monitoring different stages of the job consumption and hooking up to back end notifications to inform any interested listening entities; (5) enabling the spooling module 116 to send output data to the target entities (120, 122, 124), and so on. Section A.3 provides further details regarding exemplary logic that can be used to implement the interface functionality 114. By way of preview, a first collection of classes can be used to create (e.g., "add") the job information 102 in the production phase 104 of operation, and a second collection of classes can be used to retrieve (e.g., "get") the job information 102 in the consumption phase 106. That is, these classes can be used to selectively add elements (jobs, documents, renditions, pages, resources, metadata, etc.) to the job information 102, and to selectively get elements (jobs, documents, renditions, pages, resources, metadata, etc.) from the job information 102. The interface functionality 114 also provides functionality for retrieving information regarding the job information 102, and for enabling the generation of notifications for various events pertaining to the production and consumption of the job information 102.

In one implementation, interface functionality 114 produces the same uniform structure 108 regardless of the nature of the application module 110 which supplies the job data. For instance, the same interface functionality 114 can transform the output of a text editing application, spreadsheet application, graphics processing program, and so forth into the uniform structure 108. In another implementation, each application module 110 may include specifically tailored software to work in conjunction with the interface functionality 114 to provide the uniform structure 108. Alternatively, or in addition, the spooling module 116 can play a role in the generation of the job information 102 having the uniform structure 108.

With respect to the consumption (106) aspect of the system 100, the system 100 retrieves the resource information 102 from the spool storage 112 and supplies it to the spooling module 116 for processing. The spooling module 116 itself can represent a software program implemented by the same computing device that provides the application module 110. It includes processing logic 126 for processing the job information 102. This processing logic 126, in turn, can include management logic 128 for governing various operations performed by the processing logic 126.

The processing logic 126 can include filter logic 130 for actually performing the required processing on the job information 102. As will be described in greater detail below, the filter logic 130 can include one or more filters (132, 134, . . . 136) for performing different processing functions on the job information 102 to generate an output result. The spooling module 116 then feeds the final output result to one or more of the target entities (118, 120, 122, . . . ) via device port logic 138. In the common case of printing, one or more of the target entities (118, 120, 122, . . . ) can comprise a printer which receives the output result and prints the document(s) specified by the output result. Finally, the spooling module 116 can also include generically-labeled other logic 140 for performing other functions that are not pertinent to the focus of this disclosure and therefore will not be described further herein.

Further details regarding the filter logic 130 are provided as follows. In one implementation, the job information 102 that is processed by one or more of the filters (132, 134, . . . 136) retains the same format structure 108 as the job information 102 stored in the spooler storage 112. Thus, in this exemplary implementation, the filter logic 130 does not require that the job information 102 be converted into an intermediary form in order to process it. This, in turn, enables the spooling module 116 to processing job information 102 in an efficient manner. This also yields a uniform approach compared to other techniques which resort to a complicated assortment of disparate and ad hoc processing techniques to deal with different proprietary formats.

The functions performed by the individual filters (132, 134, . . . 136) can be generalized in the following manner. A first class of filters accepts job information 102 which conforms to the structure 108, performs some kind of processing on this information 102 (which may or may not modify the information 102), and then generates an output result which also conforms to the structure 108. A second class of filters accepts job information 102 which conforms to the structure 108, performs some kind of processing on this information 102, and then generates an output result which does not conform to the structure 108 (or which only partially conforms to the structure 108). A third class of filters accepts job information 102 which has already been converted into a non-structured format, and provides yet further modification or processing of such non-structured information.

More specifically, for example, one or more initial filters of the first class can be set up to modify the job information 102 in various ways (such as by adding a watermark, etc.), but does not otherwise change its basic format structure 108. A terminal filter (or multiple terminal filters) of the second class can be set up to modify the job information 102 by changing its format, such as by either completely removing its format structure 108 or at least partially modifying its format structure 108. More specifically, the terminal filter n (e.g., filter n 136) (or plural terminal filters) can be used to convert job information 102 having the format structure 108 into a non-structured form that can be interpreted by an identified target entity (118, 120, 122, . . . ). In effect, the terminal filter n 136 (or filters) thus serves the role of a printer driver. For instance, filter n 136 may convert the job information 102 having the structure 108 into a page description language (PDL) format that can be fed to a printer which accepts such format. In another case, a filter n−1 can convert the job information 102 into a printer-interpretable format, and filter n 136 can perform post-processing on this format, such that the combination of filter n−1 and filter n can be considered as the printer driver.

Suppose, as explained above, that the terminal filter n 136 is a filter of the first class which generates an output result having job information 102 which still conforms to the structure 108. A target entity 118 represents an appropriate device to receive such an output result. This target entity 118 is referred to as "structure-aware" because it receives job information 102 conforming to the structure 108 and thus must provide necessary processing functioning to recognize such information 102 and process it appropriately.

Suppose, alternatively, that the terminal filter n 136 is a filter of the second class or third class which generates job information which no longer conforms to the structure 108. A target entity 120 represents an appropriate entity to receive such an output result. This target entity 120 is referred to as "structure-unaware" because it receives job information 102 that no longer conforms to the structure 108, and thus the entity 120 does not need to devote any specialized functionality for processing information expressed in this structure 108; indeed, the target entity 120 need not, and generally will not, be aware that the job information 102 its receives (e.g., in an appropriate PDL format) was ever originally expressed using the structure 108.

There is a third case where the terminal filter n 136 generates an output result which modifies the structured format 108 to some extent, but still maintains some vestiges of the structure 108. Target entity 122 is an example of the kind of entity that can receive and processing this output result. FIG. 1 identifies this kind of entity 122 as being "partially structure-aware" because it should include at least some processing functionality for interpreting whatever remnants of the structure 108 that still remain in the output result.

Different jobs may require that different filtering operations be performed on the associated job information 102. A filter configuration module (not shown) can be used to define what filters (132, 134, . . . 136) are to be invoked in processing a particular job, how the individuals filters (132, 134, 136) are to be configured, and how the filters (132, 134, . . . 136) are to be chained together. La other words, the spooling module 116 can chain the filters (132, 134, . . . 136) together in different ways to produce different net effects. In a series configuration shown in FIG. 1, for example, filter A 132 feeds its output result into the input of filter B 134, and filter B 134 feed its output result into to the input of filter C (not shown), and so on.

More specifically, the type of processing that the filter logic 128 performs on the job information 102 can be controlled, in element, by one or more "print tickets" associated with the job information 102. The print tickets include attribute information that defines the operations that should be performed on the job information 102 as it passes through the filter logic 130. Different print tickets can be associated with different elements of the structure 108 of the job information 102, as will be described in the next subsection (A.2).

Further details regarding exemplary processing using chained filters and print tickets are provided in the above-captioned co-pending U.S. Ser. No. 10/794,669.

The system 100 can also function in a client-server mode of operation, where the spooling module 116 responds to requests from a client module (which may comprise one of the target entities). In a client-server implementation, a server-side application (not shown) creates document content "on-the-fly" in response to a client request. A server process generates parts of the job information 102, one at a time; while a separate process, at the same time, pulls parts from the job information 102, one at a time, to send "down" to the client module.

A.2. Overview of Structured Job Information Format

As shown in FIG. 1, the job information 102 generally includes a structure 108 defined by a plurality of nodes coupled together according to a set of established rules. The same general rules can apply to the construction and consumption of the structure 108 regardless of the application and application platform used to produce and consume the job information 102. The strategies described below therefore provide a standardized mechanism for sharing job information among participants within different programming environments.

The job information 102 uses a hierarchical scheme to connect its nodes together. A hierarchical scheme couples the nodes together using parent-child relationships. That is, a "top-most" node defines a so-called root node. The root node includes one or more child nodes, and the child nodes, in turn, can include one or more of their own respective child nodes, and so on. The child nodes can inherit methods, properties, metadata, etc. associated with their respective parent/ancestor nodes.

Generally, the structure 108 is a logical concept that may or may not map to actual elements of a document to be rendered. That is, each node may be considered an object. Certain objects may represent actual elements of a document to be rendered (such as various image resources and font resources). Other objects may not have a one-to-one relationship with elements of the documents to be rendered. These latter types of nodes are therefore analogous to folders in a file hierarchy; that is, the folders may store individual files that contain content that maps to actual elements of the document, but the folders themselves may not have a one-to-one relationship with actual elements of the document.

Figure 2:
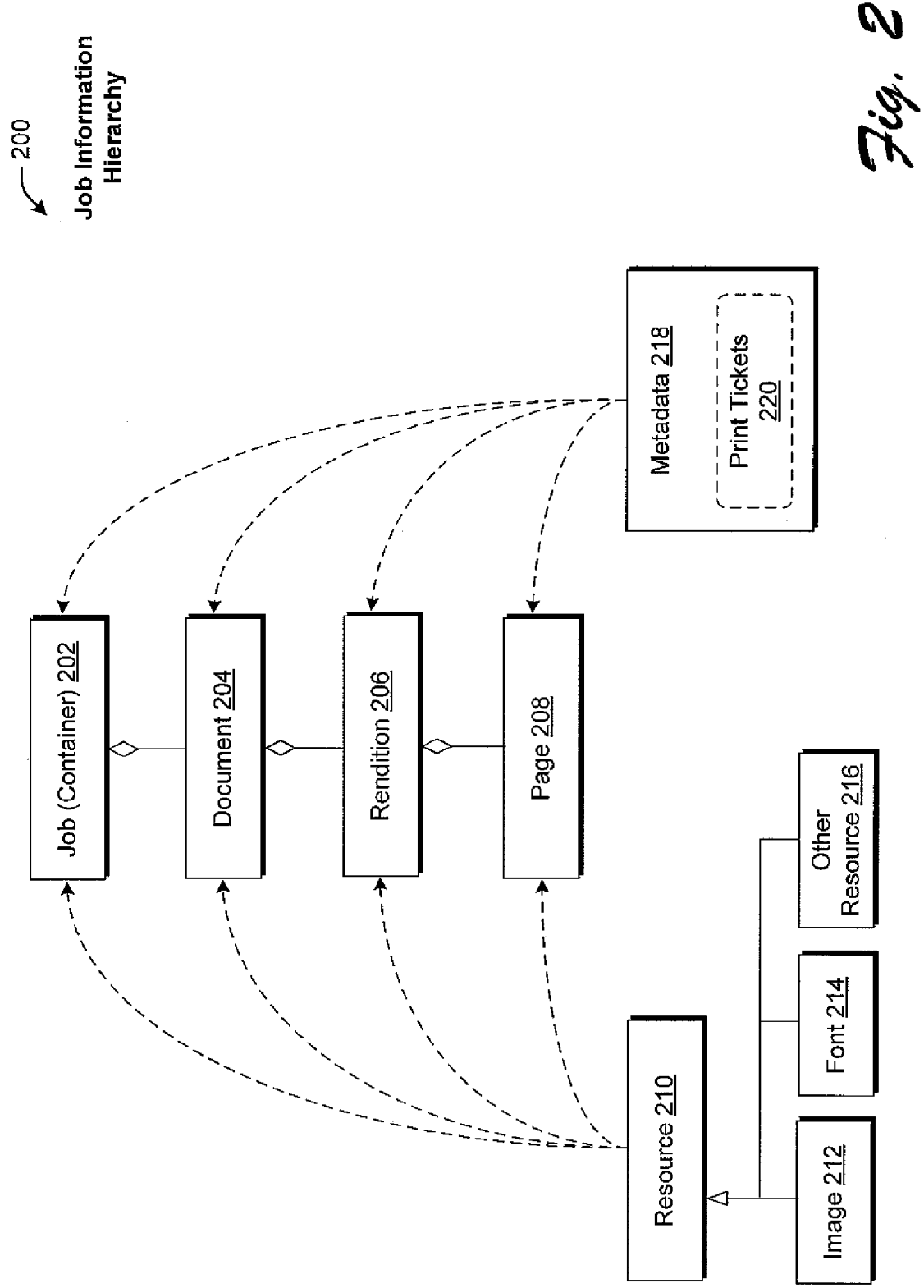
FIG. 2 shows an exemplary schema that defines the organization of the structured job information stored in the spool storage of FIG. 1.

FIG. 2 shows one exemplary and non-limiting schema 200 that can be used to form the job information 102 having the structure 108 shown in FIG. 1. The schema 200 defines a way of arranging job information 102 originally provided by the application module 110 (e.g., in the form of documents generated by the application module 110) into the hierarchical structure 108. As mentioned above, the application functionality 114 can perform this production task regardless of the nature of the application module 110. Or the spooling module 116 can also play a role in generating the required format structure 108.

The top level of the hierarchy specifies job-related information 202 that identifies the entire job itself. For instance, the job may pertain to the printing of a book including multiple chapters, and each chapter, in turn, can include multiple pages, and each page, in turn, can include font resources and image resources. In this example, the top level of the hierarchy identifies the logical package which encapsulates the entire job, that is, the entire book. The next level of the hierarchy specifies information 204 that identifies the documents associated with the job. In the example of the book, the document level might specify individual chapters in the book. Or this level of the hierarchy may specify different kinds of documents to be printed in a single print job, such a first document created using a text editor, and a second document created using a spreadsheet program, and so on, where these two documents together comprise a report of some kind.

The next level of the hierarchy specifies information 206 that identifies different renditions of the documents identified in the preceding level. For instance, consider the case of a chapter of a book. This chapter can be specified in a first rendition that requires that the chapter be printed in a black and white mode, and a second rendition that requires that the chapter be printed in a color mode. Or different renditions may correspond to different languages used to present information in the document, different page sizes, and so on. Depending on configuration information and other factors, the spooling module 116 or other processing logic can select an appropriate one of the renditions to process and present to an appropriate target entity (118, 120, . . . 122). By virtue of the ability to capture several renditions in a single package, the job information 102 having the structure 108 serves as a general blueprint from which many renditions can be generated. In general, the specification of such rendition information within the spool storage 112 itself is a unique and beneficial feature. For instance, this provides an efficient mechanism for printing different versions of the same document without having to store entire separately-tailored copies of the same document in the spool storage 112. Storing separate copies may overwhelm the storage and processing resources of the printing subsystem.

The next level of the hierarchy specifies information 208 that identifies different pages within the renditions of the documents identified in the proceeding level.

Resources can be associated with any level of the hierarchy defined by schema 200. For instance, an exemplary resource 210 can be associated with the job level 202, the document level 204, the rendition level 206, and/or the page level 208. Particular types of resources can include an image resource 212, a font resource 214, or some other resource 216.

Further, metadata 218 can be associated with any of the levels of the hierarchy of the schema 200. For instance, exemplary metadata 218 can be associated with the job level 202, the document level 204, the rendition level 206, and/or the page level 208. Metadata 218 specifies any supplemental information pertaining to the job information 102, such as an author who created a document contained in the job, a time when the document was created, various keywords pertaining to the content, a summary of the content, and so on. There are no restrictions on the type of, and meaning assigned to, metadata that can be appended to different elements of the schema 200.

A particular kind of metadata is a print ticket 220. The print ticket 220 can also be associated with any level of the hierarchy of the schema 200. For instance, exemplary metadata 220 can be associated with the job level 202, the document level 204, the rendition level 206, and/or the page level 208. A print ticket defines the types of processing operations that should be performed on associated elements of the hierarchy of the job information 102. For instance, a print ticket associated with the job package level 202 will apply to the entirety of the package defined by the job information 102. A print ticket associated with an individual page 208 of the job information 102 will have a localized effect by only affecting that page 208. Further, inheritance applies to the methods, properties, metadata, etc. in the job information 102. As such, to determine what print instruction apply to any given node, the spooling module 116 can "walk" the tree from a child node to its root (or vice versa), aggregating any print instructions that may apply along the way. This aggregation allows general instructions to be uniformly inherited by all children. A print instruction of a child node may override the general instructions of a parent node.

In summary, the schema 200 shown in FIG. 2 provides a powerful, uniform and versatile mechanism for representing complex job information, particularly for those jobs that involve multiple documents and/or multiple renditions of documents. Traditional techniques provide no provisions for representing these kinds of complex scenarios in spool storage; therefore, these traditional techniques suffer from inefficiencies, which may be significant.

In one implementation, the hierarchy of the job information 102 is fixed to provide defined levels corresponding to jobs, documents, renditions, and pages. In another implementation, the hierarchy can be varied in one or more respects. For instance, Section A.4 (presented below) sets forth a technique for creating and consuming a hierarchy of arbitrary depth.

Figure 3:
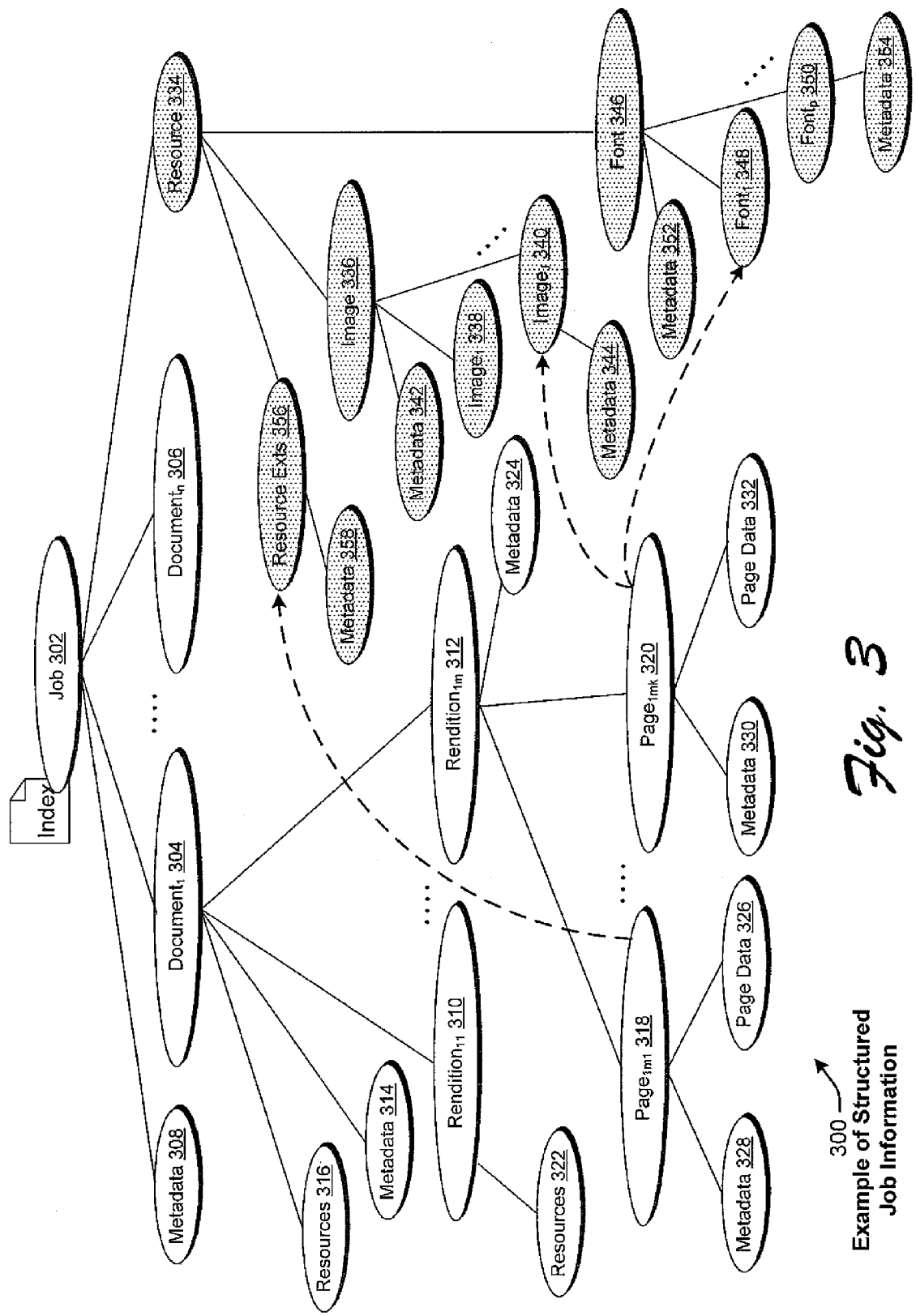
FIG. 3 shows an example of structured job information that is built using the schema of FIG. 2.

To further clarify the exemplary schema 200, FIG. 3 shows one exemplary instantiation 300 of the schema 200. The entire collection of nodes shown in FIG. 3 defines a package. The package includes a root node 302 associated with the entire package, e.g., the entire job. An index can be associated with the package, and hence with the root node 302. This index can be used to locate the package in the spool storage 112.

The job defined by the root node 302 includes a number of documents, as identified by document node 304 and document node 306. Also, a metadata node 308 is associated with the root node 302. If so configured, the metadata associated with this metadata node 308 defines properties which apply to the job as a whole.

Each of the documents associated with nodes 304 and 306 can include multiple renditions associated therewith. For example, the document represented by node 304 includes at least two renditions identified by nodes 310 and 312. As explained in connection with FIG. 2, a document may allocate separate renditions for printing a document in black and white mode, color mode, etc. No limitation is placed on what a developer may define as a rendition in the context of a particular application environment.

In addition to rendition nodes (310, 312), node 304 also includes nodes 314 and 316 associated therewith. Node 314 specifies metadata associated with node 304 and node 304 specifies a resource associated with node 304. A resource can include an image resource, a font resource, or some other resource that goes into the composition of the document represented by node 304.

Each rendition includes one or more pages associated therewith. Nodes 318 and 320, for example, represent pages associated with rendition node 312. Metadata node 322 indicates that metadata can be associated with the rendition level of the hierarchy (as it can for any level). Resource node 324 indicates that resource information can be associated with the rendition level (as it can for any level).

Finally, each page can include page data associated therewith as well as metadata. For example, page node 318 includes page data node 326 and metadata node 328 associated therewith, indicating that page data and metadata can be associated with this page. Page node 320 includes page data node 330 and metadata node 332 associated therewith, indicating that page data and metadata can be associated with this page.

The package associated with root node 302 can also include a collection of resources for shared use by different nodes in the job. Such collection of resources thus defines a shared library of resources that can be applied at different points within a document represented by the package. Particular types of resources include image resources, as represented by general image node 336. Individual image nodes (338, 340) are children of the parent image node 336, and respectively represent individual image resources. A metadata node 342 depends from the general image node 336, which represents metadata that, if so configured, applies to all of the image resources. Another metadata node 344 depends from an individual image node 340, representing metadata that applies to only this image resource associated with this node 340.

The same structure applies to font resources. A general font node 346 represents the inclusion of a plurality of font resources to select from, indicated by font nodes 348 and 350. Metadata can be associated with the general font node 346, as indicated by metadata node 352, or can be associated with a particular font resource, as indicated by metadata node 354. If so configured, metadata associated with the general font node 346 applies to all font resources while metadata associated with a particular font resource (such as font resource 350) applies only to that particular font resource.

The resources can also include a number of other types of resources, as generally indicated by resource node 356. Metadata can be associated with this node 356, as indicated by metadata node 358.

Any document-related node in the package can reference any reference node, indicating that a particular element or aspect of the document is referencing a particular resource for use thereat. For instance, in the exemplary case of FIG. 3, page node 318 references resource extensions node 356. This association is indicated with a dashed line. This means that the resource represented by node 356 is used in the page represented by page 318. Further, page node 320 is associated with image node 340 and font node 348, indicting that an image resource associated with node 340 and a font resource associated with node 348 are used in the page associated with node 320. These associations are indicated by two respective dashed lines.

Different strategies can be used to link the elements together to form the hierarchies shown in FIGS. 2 and 3. In one technique, the individual elements can be modified so that they point to linked objects (e.g., parent and child objects). Linking can be provided by pointers, Uniform Resource Locators (URLs), or some other referencing mechanism. Alternatively, or in addition, separate relationship information can be defined that specifies how separate elements are linked together. This separate relationship information thus serves as a blueprint for linking together separate objects in the job information. Among other implementations, the Extensible Markup Language (XML), or other markup language, can be used, in whole or in part, to specify the elements in the hierarchies shown in FIGS. 2 and 3 and the relationships among these elements.

Consider the specific case of attaching a resource, such as an image, to a particular node in the job information, such as a document node. This means that the image is a resource that is globally available to the document as a whole (as opposed to only an individual page in the document). The resource can be attached to the document by associating a URL with the node in the job information 102 which represents the document. More specifically, the URL can be considered as part of the metadata which is appended to this node (e.g., as exemplified by metadata 324 associated with document node 304).

Metadata can be associated with individual nodes in the hierarchical structure 108 in different ways. For instance, individual nodes can provide linking information that points to associated metadata, or the nodes themselves can embed such metadata as integral parts of the nodes, and so forth.

As noted above, the nodes shown in FIG. 3 are logical entities. Mapping rules define how the logical nodes map to parts of actual physical storage (e.g., in spool storage 112). A logical package may be "physically" embodied by a collection of loose files, a .ZIP file archive, a compound file, or some other format. In one case, some of the nodes directly correspond, in one-to-one fashion, to parts (e.g., files) stored in the spool storage 112, such as pages, image resources, font resources, etc. Other nodes may not map, in one-to-one fashion, to actual parts of the spool storage 112.

Figure 4:
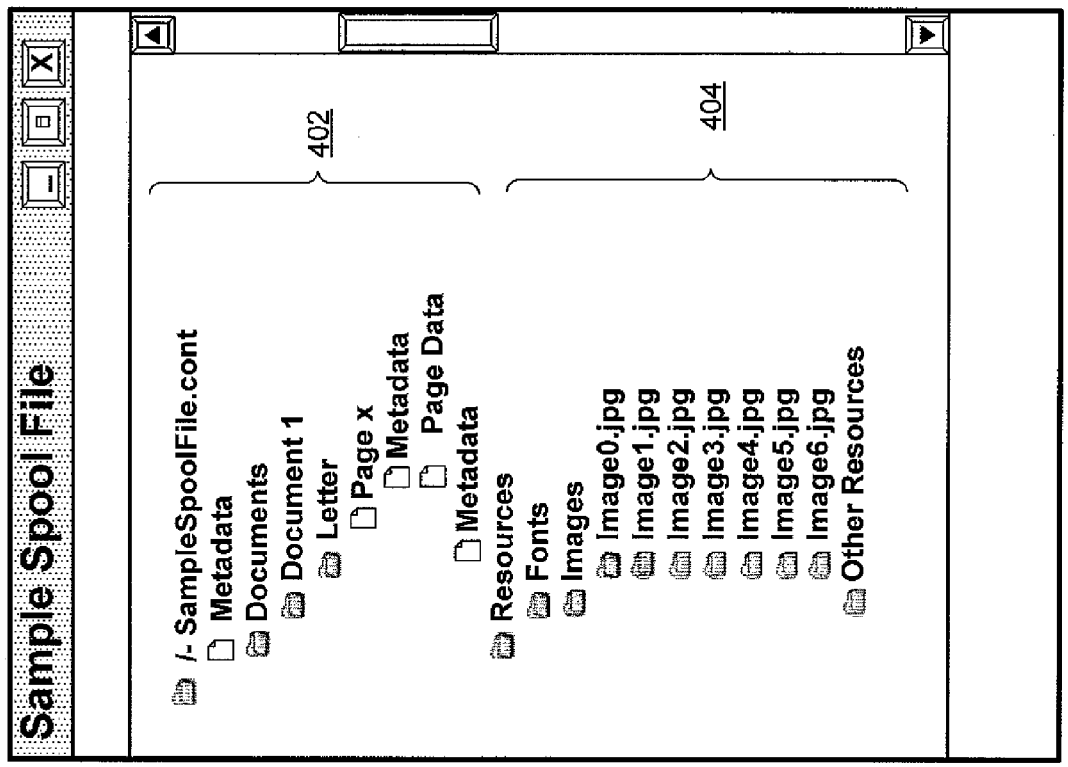
FIG. 4 shows a collection of files associated with structured job information.

FIG. 4 shows an example of a collection of files 400 associated with a single job (e.g., a single package). A container is defined by a package that is stored together as an integral unit, such as an integral composite file having individual component files. This is the case in FIG. 4. A first series of entries 402 in the file structure corresponds to the document-related nodes shown in the left portion of FIG. 3 (although FIG. 4 is not otherwise related to the example of FIG. 3). A second series of entries 404 in the file structure correspond to the resource-related nodes shown in the right portion of FIG. 3. The document-related entries 402 include a general folder node associated with a root node of the entire package. Metadata is associated with this node. The package includes a "Documents," folder, which in turn includes a "Document 1" folder, which in turn includes a "Letter" folder, which in turn includes a file labeled "Page x." These entries correspond to the hierarchy of nodes in FIG. 3 from document node to page node. A metadata file and a page data file are associated with the "Page x" file. Another metadata file is provided which applies to all of the entries of the Document 1 folder.

The second series of entries 404 includes separate folders for font resources, image resources, extended (e.g., other) resources, etc. The image folder is expanded to show an exemplary series of seven .jpg image files. These image files define shared image resources that can be referenced by any page-related node in the package. For example, the metadata information stored in the files can make reference to these resources, effectively linking specific nodes to specific resources.

Whatever the form of the physical media and file structure, information can be stored on this media in simple (direct) ordered fashion, in interleaved fashion, or some other fashion. Information can be retrieved from this physical media in sequential mode or random access mode or some other mode.

A.3. Exemplary API Functionality for Producing and Consuming Job Information

Figure 5:
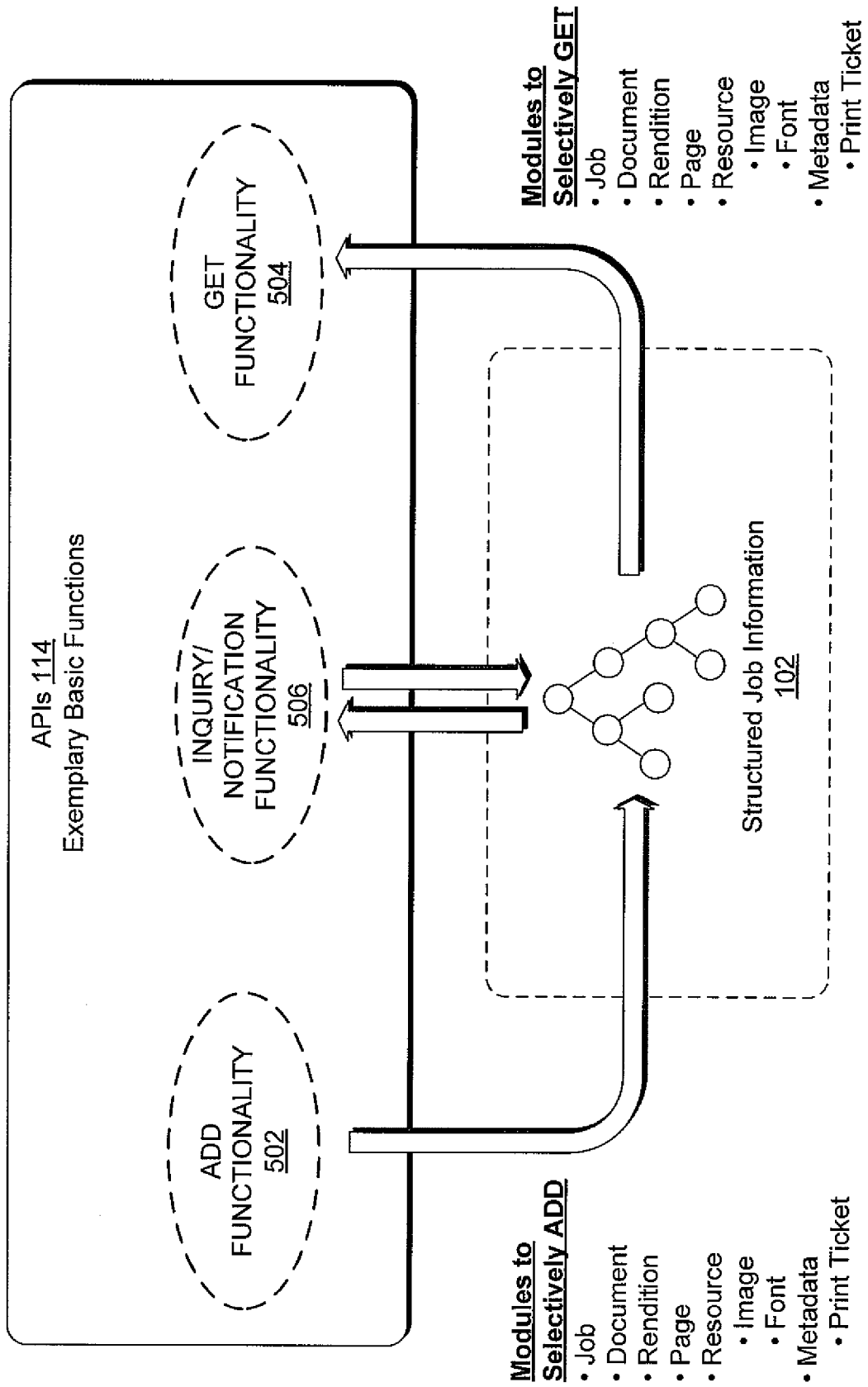
FIG. 5 shows an overview of exemplary features of an application programming interface (API) used in the system of FIG. 1.

FIG. 5 shows a high-level depiction of one exemplary implementation of the interface functionality 114 in the case of job information 102 that includes a hierarchy with levels corresponding to jobs, documents, renditions and pages. In one exemplary and non-limiting case, the interface functionality 114 can be implemented as an application program interface (API). An API refers to a library of basic routines and protocols that can be called on by other programs to execute certain tasks.

By way of overview, the interface functionality 114 facilitates interaction between the application module 110 and the job information 102 stored in spool storage 112, and between the spooling module 116 and the job information 102. This interaction can involve creating the job information 102 and storing the job information 102 in the spool storage 112, and retrieving the thus-created job information 102 from the spool storage 112. More specifically, different "clients" within the spooling module 116, such as various filters (132, 134, . . . 136), can retrieve the job information 102 for consumption using the logical hierarchical structure 108. The interface functionality 114 can also involve generating queries to determine features of the job information 102. The interface functionality can also set up various notification modules (e.g., event handlers) that generate notifications upon the occurrence of various events pertaining to the production and/or consumption of the job information.

To this end, FIG. 5 broadly shows that the interface functionality 114 can include three basic exemplary functions. "Add functionality" 502 serves the purpose of creating the job information 102. The add functionality 502 comes into play in the production phase 104 of the system 100 shown in FIG. 1. "Get functionality" 504 serves the purpose of retrieving the thus-created job information 102. The get functionality 502 can come into play in the consumption phase 106 of the system 100 shown in FIG. 1. Finally, "inquiry/notification functionality" 506 serves the role of determining various characteristics of the job information 102 in the context of the production and/or consumption of the job information 102. The inquiry/notification functionality 506 also sets up and monitors various notification modules that generate notifications upon various events associated with the production and/or consumption of the job information 102.

The following explanation provides information regarding exemplary general aspects of the interface functionality 114. This is followed by a more detailed discussion of one exemplary implementation of the interface functionality 114 which embodies these general aspects. Finally, Appendix D provides more details regarding one exemplary and non-limiting implementation of the interface functionality 114.

To begin with, the add functionality 502 and get functionality 504 can act on the job information 102 in piecemeal fashion by selectively adding and retrieving individual elements of the job information 102. For instance, the add functionality 502 can add individual elements to the hierarchy shown in FIGS. 2. That is, the add functionality 502 can be invoked to selectively add a job, document, rendition, resource (image, font or other resource), and metadata to the job information 102. Similarly, the get functionality 504 can selectively retrieve a job, document, rendition, resource (image, font or other resource), and metadata from the job information 102. Likewise, the enumeration and notification functionality 506 can selectively target different elements of the job information 102 to act upon. FIG. 5 illustrates this aspect of the interface functionality 114 by showing a bullet point breakdown of different elements that can be added to and retrieved from the job information 102.

The system 100 can implement the above-described functionality using any programming paradigm, such as an object-oriented programming paradigm. In this approach, the add functionality 502 can allocate a set of modules, e.g., classes, to the production phase 104 of the system 100. For instance, the add functionality 502 can devote separate classes having respective methods for separately adding jobs, documents, renditions, pages, resources, and so on. The add functionality 502 can automatically generate a Uniform Resource Indicator (URI) upon creation of each element (job, document, rendition, page, resource, etc.) in the hierarchy. The URI can include a name component as its last part. If a producer does not expressly specify the name, then the add functionality 502 can automatically supply the name. The interface functionality 114 can address the thus-created hierarchy by following the hierarchy to determine its elements or by directly using their URI through the root of the hierarchy.

The get functionality 504 can allocate a corresponding set of modules, e.g., classes, in the consumption phase 106 of the system 100. For instance, the get functionality 504 can devote separate classes having respective methods for separately consuming jobs, documents, renditions, pages, resources, and so on.

The interface functionality 114 can manipulate the job information in the above-described manner using different data access techniques, such as a synchronous mode of operation and an asynchronous mode of operation. In a synchronous mode of operation, a program module can invoke a function and then wait for its response before continuing on. In an asynchronous mode of operation, the program module can invoke a function and then continue on performing another task. The called function reports it results to the program module at a later time without holding up the tasks performed by the program module. One way of performing an asynchronous method is by first invoking a "begin" operation which invokes the function, prompting it to immediately return a response. The program module then continues on performing other tasks while the function executes its operation. The program module can then invoke an "end" operation which queries the function to determine whether it has performed its task yet. If so, the end operation will prompt the function to return any result generated by the function to the program module.

Further, the interface functionality 114 can manipulate the job information 102 in in any form, such as a record object, a stream object, etc. The abstraction of a stream object defines a sequence of information (e.g., bytes) constituting, for example, a file. (A client can consume a stream in piecemeal fashion as it receives the stream's data in serial fashion, without the necessity of receiving the entirety of the data in advance.) More specifically, parts of the job information 102 can be consumed while other parts of the job information 102 are being created. The interface functionality 114 can create a stream object in different ways, such as by opening a stream object associated with a record object, and so on.

The inquiry/notification functionality 506 comes into play during the production and/or consumption of the job information to facilitate the above-described tasks. For example, the inquiry/notification functionality 506 can enumerate various characteristics of the job information 102 in preparation of retrieving the job information 102. For instance, the inquiry/notification functionality 506 can determine the URI of a particular element, the parent of a particular element, the count of certain items in the hierarchy, and so on. The get functionality 504 can use this information to retrieve the enumerated elements. Further, the inquiry/notification functionality 506 can determine whether the get functionality 504 (or some other functionality) has invoked certain requests and whether these requests remain pending. For instance, the inquiry/notification functionality 506 can determine whether requests have been invoked to get any element in the hierarchy (e.g., job, document, rendition, page, resource, metadata, and so on), or whether requests have been invoked to determine certain properties of the job information (such as a request to determine a count of metadata items). Information regarding the pending status of these tasks helps the interface functionality 114 better coordinate its activities; for instance, add functionality 502 may benefit from status information regarding the consumption of job information 102 that it has created (or is in the process of creating).

The inquiry/notification functionality 506 can provide notification modules (e.g., event handlers) that provide respective notifications when various events occur in the course of producing and/or consuming the job information, such as when different elements of the job information are persisted in the spool storage and then consumed. More specifically, in the production phase 104, exemplary notification modules can provide notifications when jobs, documents, renditions, pages etc. are instantiated, committed, closed, etc. In the consumption phase 106, various notification modules can provide notifications when jobs, documents, pages, etc. are loaded, completed, etc. In one exemplary and non-limiting implementation, the inquiry/notification functionality 506 can implement the notification modules using .NET delegates. Delegates encapsulate, inside a delegate object, a reference to a method. A program can pass the delegate object to a code module, which can then call the referenced method.

Appendix D provides an exemplary collection of classes that are built according to the principles described above. The classes have names organized into an exemplary namespace, PrintSystem.PrintSysCtnr. A namespace, in the exemplary context of the .NET programming environment, refers to a logical naming scheme for grouping related types. More specifically, the .NET Framework uses a hierarchical naming scheme for grouping types into logical categories of related functionality. However, the programming paradigm used in these examples, as well as the specific names assigned to individual classes, are illustrative rather than limiting.

In the example set forth in Appendix D, any client wishing to produce job information 102 can call PrintSysCtnr.AcquireProducer( ) to retrieve a PrintSysCtnrRootProducer, and any client wishing to consume a container can call PrintSysCtnr.AcquireConsumer( ) to retrieve a PrintSysCtnrRootConsumer. PrintSysCtnrRootProducer and PrintSysCtnrRootConsumer can manage symmetrical hierarchies of jobs, documents, renditions, pages, resources, etc.

More specifically, Appendix D describes a first collection of production-related modules, e.g., classes. A base class defines functionality available to all other classes which inherit from this base class. Other classes respectively include functionality for adding a job, adding a document, adding a rendition, adding a page, adding a resource, adding metadata, and so forth. (For example, the above-referenced PrintSysCtnrRootProducer adds a job to the job information 102.) Specific classes can be devoted to adding image resources, font resources, and print tickets. The production classes can include inquiry/notification functionality 506 for receiving information regarding the status of pending tasks, and so forth.

Another series of classes respectively include functionality for getting a job, getting a document, getting a rendition, getting a page, getting a resource, getting metadata, and so forth. (For example, the above-referenced PrintSystCtnrRootConsumer gets a job from the job information 102.) Specific classes can be devoted to getting image resources, font resources, and print tickets. These consumption classes provide functionality for retrieving these elements in an asynchronous mode of operations as well as a synchronous mode of operations. These consumption classes further include inquiry/notification functionality 506 for enumerating the characteristics of the job information, and so forth.

Figure 6:
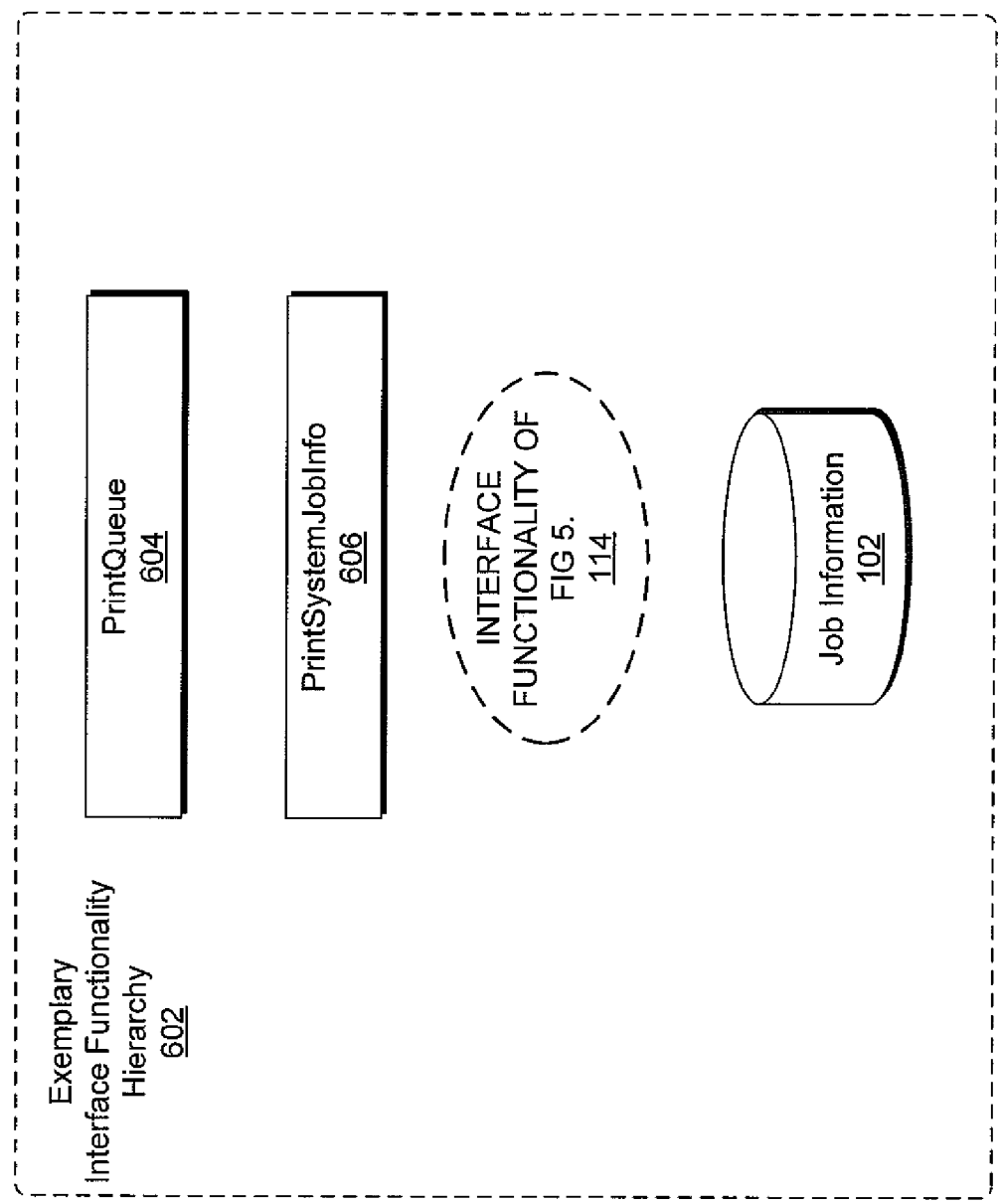
FIG. 6 shows a hierarchal organization of classes that can be used to implement an API used in the system of FIG. 1.

By virtue of the above design, the interface functionality 114 provides an abstraction for use in interacting with the job information 102. The interface functionality 114 thus can be conceptualized as a virtualized container model that wraps the underlying actual physical job information 102 stored in the spool storage 112. FIG. 6 illustrates this concept by showing the interface functionality 114 as a "shim" over the job information 102.

Other functionality can be layered on top of the job information 102, as indicated in the exemplary interface functionality 602 shown in FIG. 6. These additional methods and properties define functionality for controlling general properties of a consumption job, but not necessarily the job data itself (which is the role of the interface functionality 114).

For instance, a PrintQueue class 604 can control the job from a high level between additions, deletion, restarting, as well as enumerating all the jobs hosted by a PrintQueue. This class 604 can specifically include functionality adding a job (or jobs), getting a job (or jobs), deleting a job, restarting a job, and so forth.

Another class, PrintQueueStream (not shown in FIG. 6), provides a set of interfaces that comes into play during de-spooling job information 102 and after the data is processed and rendered by the driver. This class provides functionality for submitting the data to a target device. This class can specifically include functionality for streaming data to a target device, beginning and ending a writing task in an asynchronous manner, disposing of a job consumption task, flushing a job consumption task, and determining status information about the job consumption task, and so forth.

Another class, PrintSystemJobInfo 606, provides a set of high level interfaces for controlling tasks such as pausing a job, resuming a job, and so forth. This class can also determine (and in some cases, set) different characteristics of the job, such as job type, job priority, job ID, job submitter, position in queue, start time, number of pages, number of pages printed, job size, completion status, pause status, print status, restart status, spooling status, and so forth.

A.4. Implementation Variations: Exemplary Use of a "Reach Package" and Associated API to Create and Consume Job Information The above discussion set forth general techniques for creating and consuming job information 102 by separately adding and getting documents, renditions, pages, images, fonts, metadata, etc. to/from a defined hierarchy. The preceding section (Section A.3) also set forth a series of API modules (classes) that are specifically allocated to creating and consuming these individual features of the job information 102. However, the job information 102 can be created and consumed using alternative techniques. In one alternative technique, the job information 102 can be constructed based on building blocks and related API modules that permit a more flexible hierarchy than the first-described implementation.

In one exemplary and non-limiting technique, a more flexible hierarchy can be constructed from so-called Metro and Reach package functionality, described in the above-cited co-pending and commonly assigned U.S. patent application Ser. No. 10/836,327. More specifically, Metro functionality comprises platform-independent rules for structuring document-related information. A Reach package comprises document-related information created using the Metro functionality that satisfies certain additional Reach-related constraints. In other words, a Reach package is a specific kind, or species, of Metro document.

The following discussion sets forth exemplary features of job information 102 that conforms to Reach-related rules. The following discussion also sets forth API functionality that can be used to create and consume job information 102 constructed based on Reach-related rules.

To begin with, a Metro package is a logical entity that holds a collection of related parts. A single Metro package may contain multiple payloads, each acting as a different representation of document-related information. More precisely, a payload defines a collection of parts, including an identifiable "root" part and all the parts required for valid processing of that root part.

An individual part includes common properties (e.g., name and content type) and a stream of bytes. Part names are organized into a hierarchy, similar to paths on a file system. This hierarchy is composed of segments delineated by slashes. The last segment of the name is similar to a filename in a traditional file system. The segments of the names of all parts in a package form a tree.

Parts can reference other parts using URIs or other linking mechanisms. A part-relative URI is a reference to a part described such that the referenced part's address is determined relative to the part containing the reference. A part that references another part is referred to as a source part; the part that is referenced, in turn, is referred to as a target part. On the other hand, a package-relative URI is a reference to a part described such that the referenced part's address is determined relative to the package as a whole.

According to one feature, Metro functionality introduces a higher-level mechanism, referred to as "relationships," to describe references between parts. Relationships provide a way to represent the kind of connection between a source part and a target part in a package without modifying the parts. As such, relationships make the connections between parts directly "discoverable" without examining the content in the parts. This makes the connections independent of content-specific schema, and also allows the connections to be resolved more quickly.

Relationships can be represented using the Extensible Markup Language (XML) using relationship parts. Namely, each part in the job information 102 that is the source of one or more relationships has an associated relationship part. This relationship part holds the list of relationships for the source part (expressed in XML using a content type application/PLACEHOLDER).

Figure 7:
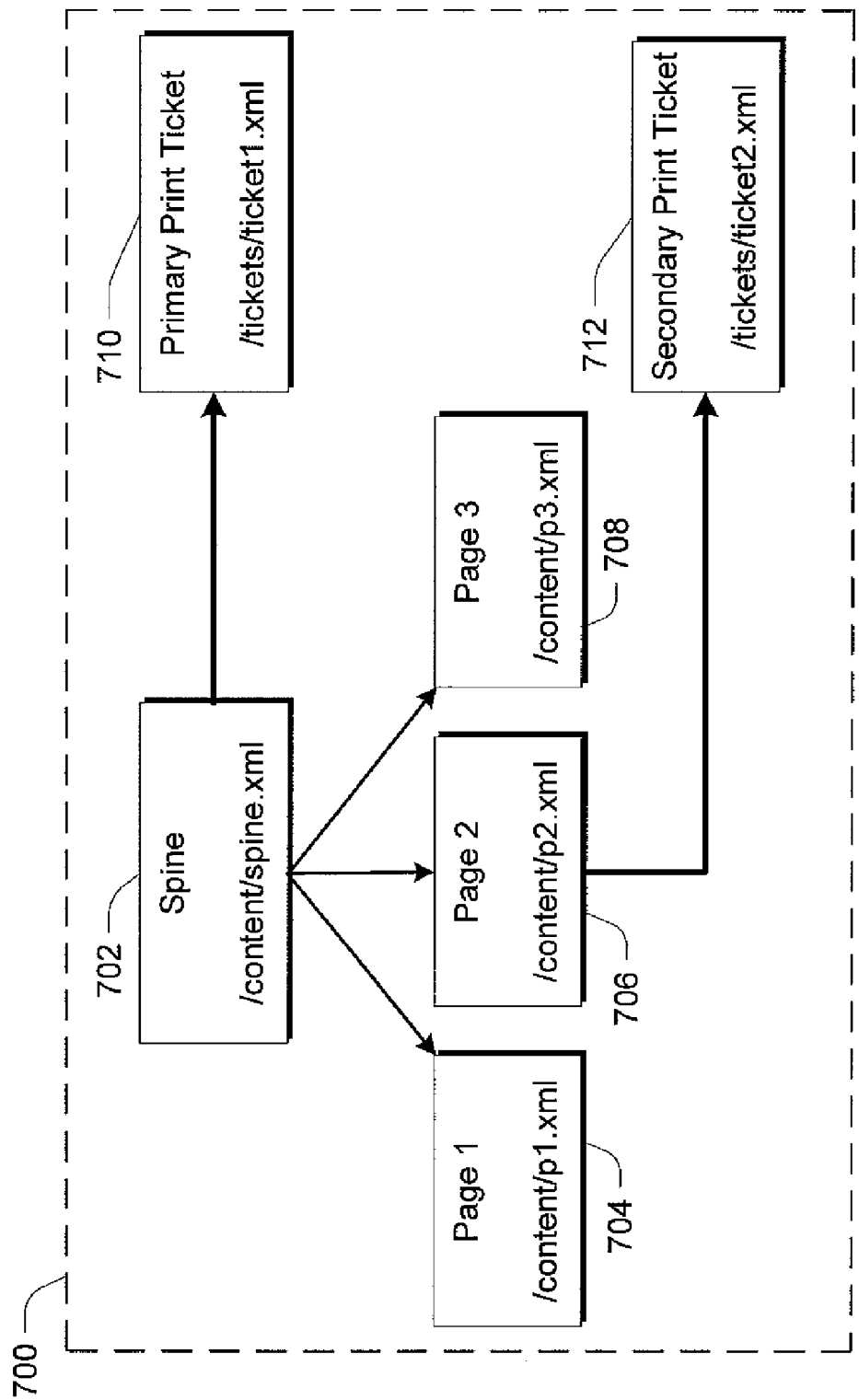
FIG. 7 shows an exemplary technique for binding the pages of a multi-page document together using a fixed panel feature.

FIG. 7 shows a fixed panel feature 702 (to be described below) (called "spine") that binds together three pages (704, 706, 708). The set of pages (704, 706, 708) bound together by the spine feature 702 has a print ticket 710 associated with it. Additionally, page 2 (706) has its own print ticket 712. The connections from the spine feature 702 to its print ticket 710 and from page 2 (706) to its print ticket (712) can be represented using the relationships mechanism described above.

More specifically, a part and its associated relationship part can be coupled together using a naming convention. In FIG. 7, the relationship part for the spine feature 702 can be stored in /content/_rels/spine.xml.rels and the relationships for page 2 (706) can be stored in /content/_rels/p2.xml.rels. Two exemplary naming conventions are used here. First, the relationship part for some other (original) part in a given "folder" in the name hierarchy is stored in a "sub-folder" called _rels. Second, the name of this relationship-holding part is formed by appending the .rels extension to the name of the original part.

In the example of FIG. 7, the relationship part associated with the spine feature 702 contains a relationship that connects the spine feature 702 to print ticket 710 as set forth below:

```
<Relationships Xmlns="Http://mmcfrels-PLACEHOLDER">
    <Relationship
        Target="../tickets/ticket1.xml"
        Name="http://mmcf-print-ticket/PLACEHOLDER"/>
</Relationships>
```

As indicated above, relationships are represented using <Relationship> elements nested in a single <Relationships> element. The "Target" element specifies a URI that points to the part at the other end of the relationship. The "Name" element specifies an absolute URI that uniquely defines the role of the relationship.

Metro functionality also provides a number of basic building block parts. A so-called "start part" defines a part that is typically processed first when a package is opened. Accordingly, the start part represents the logical root of the content stored in the package.

Metro functionality also defines two mechanisms for building higher-order structures from parts: selectors and sequences. A selector is a part which "selects" among a number of other parts. For example, a selector part might "select" between a part representing an English version of a document and a part representing a French version of the document. A sequence is a part which "sequences" a number of other parts, causing all of the part's children to be processed. For example, a sequence part might combine (into a linear sequence) two parts, one of which represents a five-page document and one of which represents a ten-page document.

These two types of composition parts (sequence and selector) and the rules for assembling these parts comprise a Metro composition model. A composition block of a package is the set of all composition parts (selector or sequence) reachable from the starting part of the package. The composition block also can define the higher-level organization of the package.

As mentioned above, a Reach package is constructed according to the provisions of Metro functionality, and is also subject to additional constraints. A Reach package may include the following features: a fixed page feature, which represents the content of a page; a fixed panel feature, which binds together a set of fixed pages in a defined order; a font feature, which defines fonts that can be applied to the document-related information in the Reach package; an image feature, which defines images that can be applied to the document-related information in the Reach package; a metadata feature, which defines descriptive metadata that can be applied to specified levels of the document-related information in the Reach package; and a print ticket feature, which defines print ticket information that can be applied to specified levels of the document-related information. A reach package can assemble these features into a so-called fixed payload. A fixed payload has a root part that contains fixed panel markup, which, in turn, references fixed page parts.

Moreover, Reach features can be combined together into different compositions to create compound documents. For instance, Reach packages support a specific kind of sequence (called a fixed panel sequence) that can be used, for example, to "glue" together a set of fixed panels into a single, larger "document." For example, two documents can be "glued" together that originate from different sources: a two-page cover memo (defining a first fixed panel feature) and a twenty-page report (defining a second fixed panel feature).

Reach packages also support a number of specific selectors that can be used when building document packages containing alternate representations of the "same" content. In particular, Reach packages allow selection based on language, color capability, and page size, etc. More specifically, a language selector chooses between representations based on their natural language. A color selector chooses between representations based on whether they are black/white or color. A page size selector chooses between representations based on their page size. A content type selector chooses between representations based on whether their content types can be understood by the system. Consider, for instance, the case of a language selector. In one example, job information 102 may constitute a bi-lingual document that uses a language selector to pick between the English representation and the French representation of the document. A language representation is chosen by inspecting the different representations and choosing the one that matches the system's specified default language.

Selectors and sequences can also contain further selectors and sequences allowing for powerful aggregate hierarchies to be built of arbitrary depth. For example, the following exemplary hierarchy is a valid Reach package: sequence-sequence-selector-sequence-fixed panel-fixed page.

A Reach package has a defined starting part, that is either a selector or a sequence. A fixed panel in a Reach package is discoverable by traversing the composition block from the starting part of the package.

Figure 8:
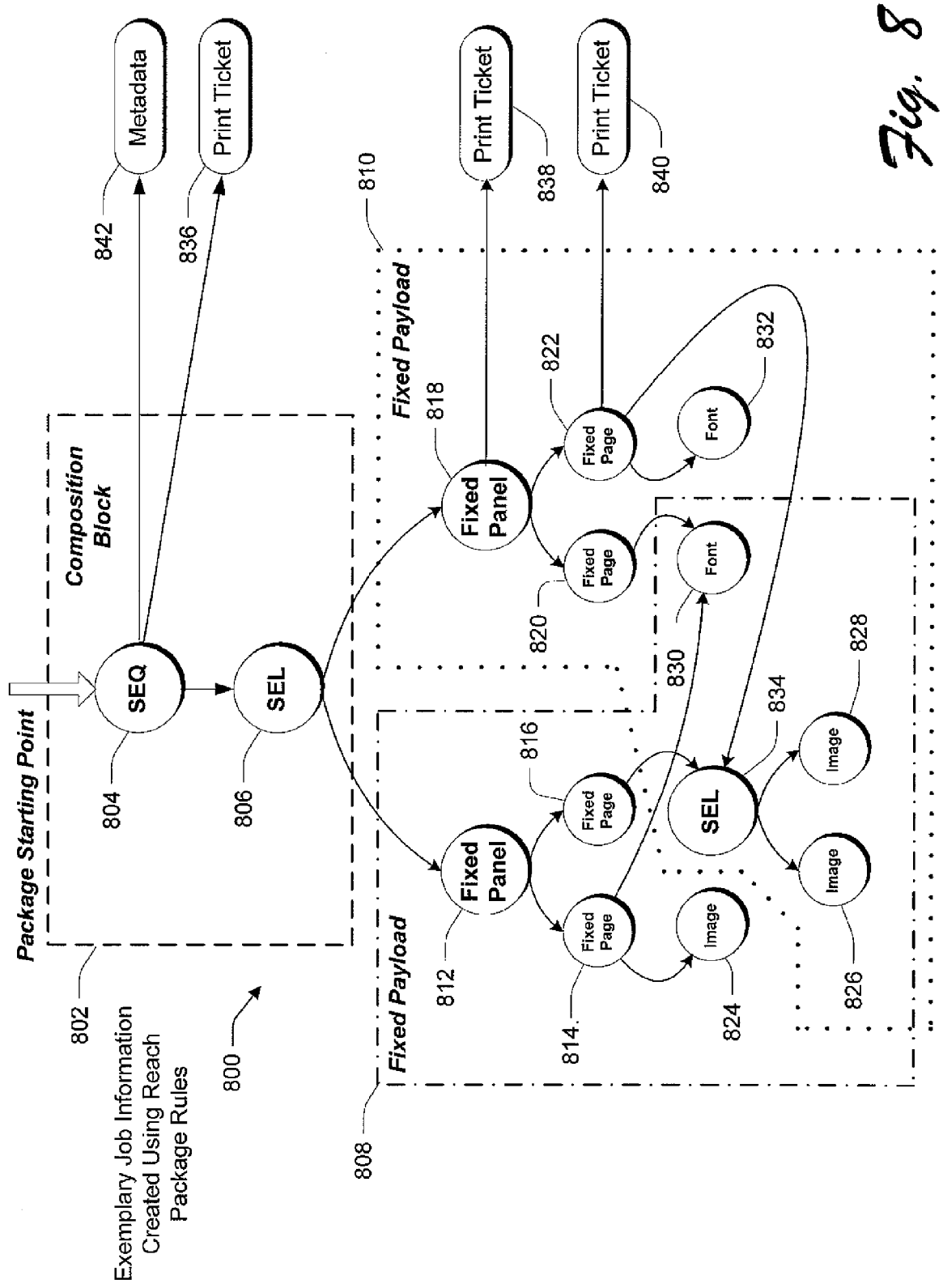
FIG. 8 shows an example of structured job information that is built in conformance with Reach-related rules.

With the above introduction, the following discussion provides more detailed information regarding fixed payloads, fixed panels, and fixed pages, followed by an example of a Reach package which embodies these features (with reference to FIG. 8).

The fixed payload is a payload whose root part is a fixed panel part. The payload encompasses all of the parts required for valid processing of the fixed panel. These include: (a) the fixed panel itself; (b) all fixed pages references from within the fixed panel; (c) all image parts referenced (directly, or indirectly through a selector part) by any of the fixed pages in the payload; (d) all Reach selectors referenced directly or indirectly from image brushes used within any of the fixed pages within the payload; (e) all font parts referenced by any of the fixed pages in the payload; (e) all descriptive metadata parts attached to any part in the fixed payload; and (f) any print tickets attached to any part in the fixed payload.

The fixed panel part of the fixed payload content is specified in markup by including a <FixedPanel> element within a <Document> element. In the example below, the <FixedPanel> element specifies the sources of the pages that are held in the fixed panel.

```
<!-- SPINE -->
<Document $XMLNSFIXED$ >
    <FixedPanel>
        <PageContent Source="p1.xml" />
        <PageContent Source="p2.xml" />
    </FixedPanel>
</Document>
```

The <FixedPanel> element logically binds an ordered sequence of pages together into a single multi-page document. Pages can specify their own width and height, but a <FixedPanel> element can also optionally specify a height and width. This information can be used for a variety of purposes, including, for example, selecting between alternate representations based on page size. Each <PageContent> element refers to the source of the content for a single page. The source is specified as a URI string that refers to the page content, held in a distinct location within the package. The number of pages in the document can be determined by counting the number of <PageContent> children contained within the <FixedPanel> element. As with the <FixedPanel> element, the <PageContent> element can optionally include a PageHeight and PageWidth attribute, here reflecting the size of the single page. Each <PageContent> element in the <FixedPanel> element references a fixed page part.

Each fixed page part represents a page's contents in a <FixedPage> element with <Path> and <Glyphs> elements (which are together the basis for all marks rendered on a fixed page), and a <Canvas> element to group these elements. References to images from within any fixed page in a fixed payload can point to a selector part which can make a selection (potentially recursively through other selectors) to find the actual image part to be rendered.

More specifically, each fixed page part contains FixedPage markup describing the rendering of a single page of content. The excerpt provided below shows exemplary markup of the source content that can be used for the page referenced in the sample markup above (<PageContent Source="p1.xml"/>):

```
// /content/p1.xml
    <FixedPage PageHeight="1056" PageWidth="816">
        <Glyphs
            OriginX = "96"
            OriginY = "96"
            UnicodeString = "This is Page 1!"
            FontUri = "../Fonts/Times.TTF"
            FontRenderingEmSize = "16"
        />
    </FixedPage>
```

FIG. 8 shows one example of job information 800 that can be created using Metro and Reach functionality. The job information 800 includes a composition block 802 that includes a sequence part 804 and a selector part 806. The sequence part 804 can "glue" together a number of other parts. The selector part 806 can select between different parts.

Namely, the selector part 806 selects between fixed payload 808 and fixed payload 810. Fixed payload 808 has a structure defined by a fixed panel 812. Namely, the fixed panel 812 "glues" together two fixed pages (814, 816). Fixed payload 810 has a structure defined by another fixed panel 818. The fixed panel 818 binds together two fixed pages (820, 822). The fixed pages (814, 816, 820, 822) can reference a number of font and image resources (824, 826, 828, 830, 832). A selector 834 can be used that allows fixed pages 816 and 822 to select either image 826 or image 828. Further note that fixed pages from different fixed payloads (808, 810) can share resources. For instance, both fixed payloads (808, 810) can draw from image resources 826 and 828. Both fixed payloads (808, 810) can also draw from font resource 830.

Finally, the job information 800 can attach print tickets (836, 838, 840) and metadata 842 to various levels in the hierarchy.

Although Metro and Reach terminology was used to describe the implementation in this section (A.4), these principles can be applied to create the job information 102 shown in FIGS. 2 and 3, which is composed of jobs, documents, renditions, pages and resources (e.g., images and fonts). For instance, one or more sequence parts can be used to tie together several multi-page documents. One or more selector parts can be used to select between different renditions (defined by different fixed payloads, represented by fixed panel features). And the fixed pages can be used to implement the pages identified in FIGS. 2 and 3. However, the principles described in this section (A.4) permit certain variations in the job hierarchy, allowing for the creation of hierarchies of arbitrary depth.

Corresponding Reach-enabled API functionality can be used to create and consume job information 102 that conforms to the Reach package structure. Like the examples set forth in FIG. 5 (with respect to the fixed-hierarchy job information 102), the Reach-enabled API functionality can include "add functionality" for adding parts to the Reach-constructed job information 102, and "get functionality" for retrieving parts from the Reach-constructed job information. More specifically, the Reach-enabled API functionality can include logic for adding and getting root parts of the job information 102, selector parts, sequence parts, fixed panel parts, fixed page parts, image resources, font resources, print tickets, and so forth. The root parts can correspond to selector parts or sequence parts.

Also, like the case of FIG. 5, the Reach-enabled API functionality can include inquiry/notification functionality for determining various characteristics of the job information 102 in the context of the production and/or consumption of the job information 102. The inquiry/notification functionality can also set up and monitor various notification modules that generate notifications upon the occurrence of various events associated with the production and/or consumption of the job information 102.

Also, like the case of FIG. 5, the Reach-enabled API functionality can manipulate the job information 102 using different data access techniques, such as a synchronous mode of operation and an asynchronous mode of operation.

Also, like the case of FIG. 5, the Reach-enabled API functionality can manipulate the job information 102 in any form, such as a record object, a stream object, etc.

As a final note to this section, unless otherwise stated, subsequent references to jobs, documents, renditions, pages and resources are intended to abstractly refer to any implementation of these features, including, but not limited to, the fixed-hierarchy examples developed in Section A.3 and the flexible-hierarchy examples developed in this section (Section A.4). In other words, unless otherwise noted, the terms jobs, documents, renditions, pages and resources should be construed in an implementation-independent manner. Moreover, the labels themselves (e.g., jobs, documents, renditions, pages, etc.) are arbitrary; for example, a level in the hierarchy that serves the role of representing different versions of a document can be regarded as a "rendition" level based on its operative role, regardless of a particular implementation's naming convention, which may refer to this level using a different term.

B. Exemplary Method of Operation

Figure 9:
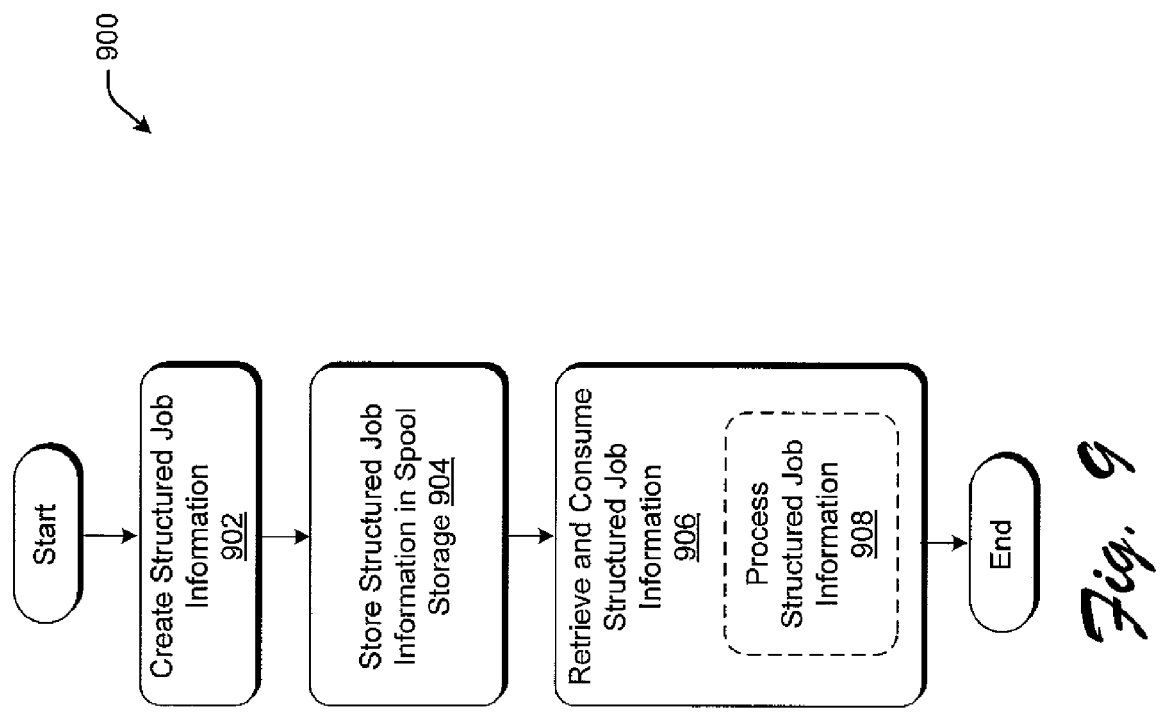
FIG. 9 shows an exemplary method for producing and consuming structured job information using the system of FIG. 1.

FIG. 9 describes the operation of the system 100 of FIG. 1 in flow chart form. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure.

The procedure 900 includes step 902 of generating the job information 102 having the structure 108. To perform this task, the application module 110 can generate job data, and the APIs 114 (and possibly the spooling module 116) can produce the job information 102 having the format 108 by applying the various production-related classes described in Section A.3 (or, in the case of the flexible-hierarchy model, Section A.4). Step 904 represents the actual storage of this generated job information in the spool storage 112.

Step 906 entails retrieving the job information 102 from the spool storage 112 and consuming this job information 102 using the spooling module 116 and by applying the consumption-related classes described in Section A.3 (or, in the case of the flexible-hierarchy model, Section A.4). Such consumption may entail applying different combinations of processing operations provided by individual filters (132, 134, . . . 136). Step 908 generally represents any such processing of job information 102. The processing may entail converting the job information 102 having the structure 108 to processed job information 102 that still maintains the structure 108. This output result would be appropriate to send to the "structure-aware" target entity 118 which can interpret this structure 108. The processing may alternatively entail converting the job information 102 having the structure 108 into job information that no longer has any semblance to the structure 108. This output result would be appropriate to send to the "structure-unaware" target entity 120. Or the processing may entail converting the job information 102 having the structure 108 to processed job information 102 that has some vestiges of the structure 108, but which deviates from the structure in one or more respects. This output result would be appropriate to send to the "partially structure-aware" target entity 122.

Whatever the case, upon receipt of the job information, the target entities (120, 122, 124, . . . ) can perform prescribed processing on the job information, such as by printing it, displaying it, archiving it, etc.

C. Exemplary Computer Environment

In one exemplary implementation, the application module 110, APIs 114, and spooling module 116 can be implemented by software executed by a computing device. In this case, FIG. 10 provides information regarding an exemplary computer environment 1000 that can be used to implement this functionality. Insofar as a target entity is implemented by a computing mechanism as well, such a computing mechanism can also be implemented using the type of computing environment 1000 shown in FIG. 10, or using a related environment.

The computing environment 1000 includes a general purpose type computer 1002 and a display device 1004. However, the computing environment 1000 can include other kinds of computing equipment. For example, although not shown, the computer environment 1000 can include hand-held or laptop devices, set top boxes, mainframe computers, etc. Further, FIG. 10 shows elements of the computer environment 1000 a grouped together to facilitate discussion. However, the computing environment 1000 can employ a distributed processing configuration. In a distributed computing environment, computing resources can be physically dispersed throughout the environment.

Exemplary computer 1002 includes one or more processors or processing units 1006, a system memory 1008, and a bus 1010. The bus 1010 connects various system components together. For instance, the bus 1010 connects the processor 1006 to the system memory 1008. The bus 1010 can be implemented using any kind of bus structure or combination of bus structures, including a memory bus or memory controller, a peripheral bus, an accelerated graphics port, and a processor or local bus using any of a variety of bus architectures.

Computer 1002 can also include a variety of computer readable media, including a variety of types of volatile and non-volatile media, each of which can be removable or non-removable. For example, system memory 1008 includes computer readable media in the form of volatile memory, such as random access memory (RAM) 1012, and non-volatile memory, such as read only memory (ROM) 1014. ROM 1014 includes an input/output system (BIOS) 1016 that contains the basic routines that help to transfer information between elements within computer 1002, such as during start-up. RAM 1012 typically contains data and/or program modules in a form that can be quickly accessed by processing unit 1006.

Other kinds of computer storage media include a hard disk drive 1018 for reading from and writing to a non-removable, non-volatile magnetic media, a magnetic disk drive 1020 for reading from and writing to a removable, non-volatile magnetic disk 1022 (e.g., a "floppy disk"), and an optical disk drive 1024 for reading from and/or writing to a removable, non-volatile optical disk 1026 such as a CD-ROM, DVD-ROM, or other optical media. The hard disk drive 1018, magnetic disk drive 1020, and optical disk drive 1024 are each connected to the system bus 1010 by one or more data media interfaces 1028. Alternatively, the hard disk drive 1018, magnetic disk drive 1020, and optical disk drive 1024 can be connected to the system bus 1010 by a SCSI interface (not shown), or other coupling mechanism. Although not shown, the computer 1002 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 1002. For instance, the readable media can store the operating system 1030, application modules 1032 (e.g., for implementing the application module 110), other program modules 1034, and program data 1036. The computer readable media can also store, although not shown, logic for implementing the APIs 114 and spooling module 116. Any of the above-described storage media can be used to implement the spool storage 112, such as hard disk 1018.

The computer environment 1000 can include a variety of input devices. For instance, the computer environment 1000 includes the keyboard 1038 and a pointing device 1040 (e.g., a "mouse") for entering commands and information into computer 1002. The computer environment 1000 can include other input devices (not illustrated), such as a microphone, joystick, game pad, satellite dish, serial port, scanner, card reading devices, digital or video camera, etc. Input/output interfaces 1042 couple the input devices to the processing unit 1006. More generally, input devices can be coupled to the computer 1002 through any kind of interface and bus structures, such as a parallel port, serial port, game port, universal serial bus (USB) port, etc.

The computer environment 1000 also includes the display device 1004. A video adapter 1044 couples the display device 1004 to the bus 1010. In addition to the display device 1004, the computer environment 1000 can include other output peripheral devices, such as speakers (not shown), a printer (not shown), etc. Any of these units can constitute the target entities (120, 122, . . . 124) shown in FIG. 1.

Computer 1002 operates in a networked environment using logical connections to one or more remote computers, such as a remote computing device 1046. The remote computing device 1046 can comprise any kind of computer equipment, including a general purpose personal computer, portable computer, a server, remote printer or archival device, etc. Any of these units can also constitute the target entities (120, 122, . . . 124) shown in FIG. 1. Remote computing device 1046 can include all of the features discussed above with respect to computer 1002, or some subset thereof.

Any type of network 1048 can be used to couple the computer 1002 with remote computing device 1046, such as a WAN, a LAN, etc. The computer 1002 couples to the network 1048 via network interface 1050, which can utilize broadband connectivity, modem connectivity, DSL connectivity, or other connection strategy. Although not illustrated, the computing environment 1000 can provide wireless communication functionality for connecting computer 1002 with remote computing device 1046 (e.g., via modulated radio signals, modulated infrared signals, etc.).

D. Appendix: Exemplary Interface Functionality

The following exemplary classes can be used to implement the interface functionality 114 for the case of fixed-hierarchy job information 102. Namely, these classes provide functionality for creating jobs, retrieving jobs, providing various notifications concerning the production and consumption of jobs, enumerating jobs, and so forth. Any object-oriented paradigm can be used to implement these classes, such as the .NET virtual programming environment (utilizing the CLR) provided by Microsoft Corporation. However, the principles set forth herein are not limited to the following exemplary and illustrative implementation.

To begin with, an abstract class PrintSysCtnrBaseProducer defines a base class of all types of elements that can be created in a container by a producer. This class can include various functions, such as the following exemplary list of functions:

SetMetadata attaches an arbitrary metadata item to an element.

AddResource adds a resource item to an element. An element can link to a resource by storing linking information in its metadata.

GetStream returns a stream object attached to an identified object.

Commit commits all added metadata and objects to file.

Close commits and closes an identified object and contained stream.

GetStreamPending returns an indication of "true" if a request is pending as a result of the invocation of certain requests to perform streaming operations.

GetMetadataPending returns an array of pending requests as a result of the invocation of certain requests to retrieve metadata.

GetMetadataCountPending returns an indication of "true" if a request is pending as a result of the invocation of certain requests to determine the count of metadata.

GetResourcesPending returns an array of pending requests as a result of the invocation of certain requests to retrieve resources.

GetResourceCountPending returns an indication of "true" as a result of the invocation of certain requests to retrieve a resource count.

GetURI returns a URI that was automatically generated upon creation of an identified element.

An abstract class PrintSysCtnrBaseConsumer defines a base class of all types of elements that can be consumer from a container by the consumer. This class can include various functions, such as the following exemplary list of functions:

(Asynchronous Methods)

BeginGetMetadata reads a collection of metadata from an identified object. If a callback defined by this function is null, it blocks, otherwise this function operations in an asynchronous manner.

BeginGetMetadata reads a metadata item identified by name from an identified object. If a callback defined by this function is null, it blocks, otherwise this function operations in an asynchronous manner.

EndGetMetadata blocks until metadata collection is complete or a requested number of items have been read. It returns a number of items read.

BeginGetMetadataCount initiates an asynchronous request to retrieve a total number of metadata items attached to an identified element.

EndGetMetadataCount can be called from callback. It returns a total number of metadata items attached to an identified element.

BeginGetResources reads a collection of resources from an identified object.

EndGetResources blocks until resource collection is complete or a requested number of items have been read. It returns a number of items read.

BeginGetResourceCount initiates an asynchronous request to retrieve a total number of resource items attached to an identified element.

EndGetResourceCount can be called from callback. It returns a total number of resource items attached to an identified element.

BeginGetStream returns a user stream attached to an identified object. If a synchronous read operation is performed on the stream, it can block until the producer has closed.

EndGetStream blocks until a user stream object becomes available after the invocation of a BeginGetStream request or the identified element is finalized without attaching a user stream.

(Synchronous methods)

GetMetadata reads a collection of Metadata items from an identified object. It blocks until requested items become available, or until the collection in a container is finalized. It returns a number of items read.

GetMetadata reads a metadata item identified by name from an identified object. It blocks until requested items become available, or until the collection in a container is finalized. It returns "true" if the item is found.

GetMetadataCount blocks until a metadata collection is complete and returns a number of items.

GetResources reads a collection of resource items from an identified object. It blocks until the requested items become available, or until the collection in a container is finalized. It returns a number of items read.

GetResourceCount blocks until a resource collection is complete. It returns a number of items.

GetStream returns a user stream attached to an identified object. If there is no user stream yet, the call blocks until one becomes available or the element is finalized. This stream supports asynchronous reads. If a synchronous read operation is performed on the stream, it can block until the producer has closed.

A class PrintSysCtnrRootProduce, which inherits from the class PrintSysCtnrBaseProducer, provides the following exemplary functions:

AddJob adds a job object to the container.

GetJobsPending returns an array of pending requests as a result of the invocation of certain requests to retrieve jobs.

GetJobCountPending returns an indication of "true" if a request is pending as a result of the invocation of certain requests to get job count.

A class PrintSysCtnrRootConsumer, which inherits from the class PrintSysCtnrBaseConsumer, provides the following exemplary functions:

(Asynchronous Methods)

BeginGetJobs reads a collection of jobs from an identified object. If a callback defined by this function is null, it blocks, otherwise this function operations in an asynchronous manner.

EndGetJobs blocks until job collection is complete or a requested number of items have been read and returns number of items read.

BeginGetJobCount initiates an asynchronous request to retrieve a total number of job items attached to an identified element.

EndGetJobCount is called from callback. It returns a total number of job items attached to an identified element.

(Synchronous Methods)

GetJobs reads a collection of job items from an identified object. It blocks until requested items become available, or until a collection in the container is finalized. It returns a number of items read.

GetJobCount blocks until job collection is complete. It returns a number of items.

A class PrintSysCtnrJobProducer, which inherits from the class PrintSysCtnrBaseProducer, includes the following exemplary functions:

AddDocument adds a new document to a job.

AddToPrintList adds an item to a list of objects that have to be printed (where the item can be a document, rendition, page, etc.).

DocumentsConsumePending returns an array of pending requests as a result of the invocation of certain requests to retrieve documents.

GetDocumentCountPending returns an indication of "true" if a request is pending as a result of the invocation of certain requests to get document count.

GetPrintListPending returns an array of pending requests as a result of the invocation of certain requests to get prints lists.

GetPrintListCountPending returns an indication of true if a request is pending as a result of the invocation of certain requests to get print list count.

A class PrintSysCtnrJobConsumer, which inherits from the class PrintSysCtnrBaseConsumer, provides the following exemplary functions:

(Asynchronous Methods)

BeginGetDocuments reads a collection of documents from an identified object. If a callback defined by this function is null, it blocks, otherwise this function operations in an asynchronous manner.

EndGetDocuments blocks until a document collection is complete or a requested number of items have been read. It returns number of items read.

BeginGetDocumentCount initiates an asynchronous request to retrieve a total number of document items attached to an identified element.

EndGetDocumentCount can be called from callback. It returns a total number of document items attached to an identified element.

BeginGetPrintList gets a collection of objects to be printed.

EndGetPrintList blocks until a print list URI collection is complete or until a requested number of items have been read. It returns a number of items read.

BeginGetPrintListCount initiates an asynchronous request to retrieve a total number of print list items attached to an identified element.

EndGetPrintListCount is called from callback. It returns a total number of print list items attached to an identified element.

(Synchronous Methods)

GetJobs reads a collection of job items from an identified object. It blocks until requested items become available, or a collection in the container is finalized. It returns a number of items read.

GetJobCount blocks until a job collection is complete. It returns a number of items.

GetPrintListCount blocks until a print list collection is complete. It returns a number of items.

A class PrintSysCtnrDocumentProducer, which inherits from the class PrintSysCtnrBaseProducer, provides the following exemplary functions:

AddRendition adds a rendition object to an identified document.

GetRenditionsPending returns an array of pending requests as a result of the invocation of certain requests to get renditions.

GetJobCountPending returns an indication of "true" if a request is pending as a result of the invocation of certain requests to get job count A class PrintSysCtnrDocumentConsumer, which inherits from the class PrintSysCtnrBaseConsumer, provides the following exemplary functions:

(Asynchronous Methods)

BeginGetRenditions reads a collection of renditions from an identified object. If a callback defined by this function is null, it blocks, otherwise this function operations in an asynchronous manner.

EndGetRenditions blocks until rendition collection is complete or a requested number of items has been read. It returns number of items read.

BeginGetRenditionCount initiates asynchronous request to retrieve a total number of rendition items attached to an identified element.

EndGetRenditionCount is called from callback. It returns a total number of rendition items attached to an identified element.

(Synchronous Methods)

GetRenditions reads a collection of rendition items from an identified object. It blocks until the requested items become available, or until the collection in the container is finalized. It returns a number of items read.

GetRenditionCount blocks until a rendition collection is complete. It returns a number of items.

ParentJob returns the associated parent job

A class PrintSysCtnrRenditionProducer, which inherits from the class PrintSysCtnrBaseProducer includes the following exemplary functions:

AddPage adds a page object to a rendition.

GetPagesPending returns an array of pending requests as a result of the invocation of certain requests to get pages.

GetJobCountPending returns an indication of "true" if a request is pending as a result of the invocation of certain requests to get job content.

A class PrintSysCtnrRenditionConsumer, which inherits from the class PrintSysCtnrBaseConsumer, includes the following exemplary functions:

(Asynchronous Methods)

BeginGetPages reads a collection of pages from an identified object. If a callback defined by this function is null, it blocks, otherwise this function operations in an asynchronous manner.

EndGetPages blocks until page collection is complete or a requested number of items have been read. It returns a number of items read.

BeginGetPageCount initiates an asynchronous request to retrieve a total number of page items attached to an identified element.

EndGetPageCount is called from call back. It returns a total number of page items attached to an identified element.

(Synchronous Methods)

GetPages reads a collection of page items from an identified object. It blocks until the requested items become available, or until the collection in the container is finalized. It returns a number of items read.

GetPageCount blocks until page collection is complete. It returns a number of items.

ParentJob returns the associated parent job.

ParentDocument returns the associated parent document.

A class PrintSysCtnrPageProducer, which inherits from the class PrintSysCtnrBaseProducer, includes the following functions:

AddFixedPage. The actual page markup can be added in at least two ways: a) using GetStream and manually writing markup to that stream; and b) using AddFixedPage by performing serialization in the delegate callback. The latter method is preferred between filters because it allows retention of the in-memory page; further, necessary serialization can be avoided. PrintSysCtnrPageProducer defines a wrapper for a single page FixedPage; calling AddFixedPage more than once ca n throw an exception.

GetFixedPagePending returns an indication of "true" if certain requests to get a page are pending.

A class PrintSysCtnrPageConsumer, which inherits from the class PrintSysCtnrBaseConsumer, includes the following exemplary functions:

(Asynchronous Methods)

Begin GetFixedPage provides a procedure for getting a page. A page can be obtained in two ways: a) by using GetStream and manually parsing data; and b) by using BeginGetPage called with a parser in a state argument. The latter technique is preferred between filters because it potentially avoids unnecessary serialization and parsing.

EndGetPage follows up the BeginGetPage operation.

(Synchronous Methods)

GetStream can be used to synchronously retrieve a user stream. The returned stream can be parsed.

Get ParentJob returns the associated parent job.

Get ParentDocument returns the associated parent document.

Get ParentRendition returns the associated parent rendition.

A class PrintSysCtnrResourceProducer, which inherits from the class PrintSysCtnrBaseProducer, provides the following exemplary functions:

AddObject provides a technique for adding an object to an element. The actual resource markup can be added in at least two ways: a) by using GetStream and manually writing markup to that stream; and b) using AddObject by performing serialization in the delegate callback. The latter procedure is preferred between filters because it allows for the retention of the in-memory resource, thereby avoiding unnecessary serialization. PrintSysCtnrResourceProducer is a wrapper for a single resource object; calling AddObject more than once can throw an exception.

GetObjectPending returns an indication of "true" if certain requests to get an object are pending.

A class PrintSysCtnrResourceConsumer, which inherits from the class PrintSysCtnrBaseConsumer, includes the following exemplary functions:

(Asynchronous Methods)

Begin GetObject provides a technique for getting a resource. A resource can be obtained in at least two ways: a) by using GetStream and manually parsing data; and b) by BeginGetResource called with parser in state argument. The latter is preferred between filters because it potentially avoids unnecessary serialization and parsing.

EndGetResource follows up BeginGetResource to retrieve a resource.

(Synchronous Methods)

GetStream can be used to synchronously retrieve the user object. The returned stream can be parsed.

A class PrintSysCtnrImageProducer, which inherits from the class PrintSysCtnrResourceProducer, provides special functionality tailored to produce image resources.

A class PrintSysCtnrImageConsumer, which inherits from the class PrintSysCtnrResourceConsumer, provides special functionality tailored to retrieve image resources.

A class PrintSysCtnrFontProducer, which inherits from the class PrintSysCtnrResourceProducer, provides special functionality tailored to produce font resources.

A class PrintSysCtnrFontConsumer, which inherits from the class PrintSysCtnrResourceConsumer, provides special functionality tailored to consume font resources.

A class Consumer Metadata includes the following functions:

Get PropertyName retrieves the metadata property name.

GetObject retrieves the metadata object. This can return "null" if the metadata was set as a stream.

GetStream retrieves the Metadata stream. This will return "null" if the metadata was set as an object.

A class ProducerMetadata includes the following exemplary functions:

ProducerMetadata creates a ProducerMetadata item that can then be attached to an arbitrary element.

ProducerMetadata creates a ProducerMetadata item that can then be attached to an arbitrary element.

A class EffectivePrintTicketHandler provides functionality for merging information PrintTickets on multiple levels in the job hierarchy along an access path to the current node in the hierarchy. This functionality can perform this task by "walking up" the hierarchy using the parent properties of each node, and then walking back down and merging the Print-Tickets along the way. This class can include the following exemplary functions:

PrintTicket GetEffectivePT gets an effective PrintTicket for a job, document, rendition, or page, etc. (depending on which one is specified).

SetPrintTicket sets the PrintTicket for a job, document, rendition, or page, etc. (depending on which one is specified). This function uses generic SetMetadata functionality. The client is responsible for setting only those attributes in the PrintTicket that should be shared at the identified level to which the ticket is attached.

API functionality for Reach-model job information 102 can also include a number of classes. The classes can include functionality for adding and getting root information parts, selector parts, sequence parts, fixed panel parts, fixed page parts, image resources, font resources, print tickets, and so on. In addition, Reach-model API functionality can also include logic for determining various features of the job information 102 (such as page count, etc.), and for generating various notifications (such as notifications that signal the completion of various operations).

In closing, a number of examples were presented in this disclosure in the alternative (e.g., case A or case B). In addition, this disclosure encompasses those cases which combine alternatives in a single implementation (e.g., case A and case B), even though this disclosure may not have expressly mention these conjunctive cases in every instance.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A system for consuming job information stored on a spool storage by a spooling module, the system comprising:
a processing unit; and
memory accessible to the processing unit, the memory comprising:
logic configured to consume a data structure that specifies the job information from the spool storage, wherein the data structure defines a plurality of nodes organized into a hierarchical arrangement representing different aspects of the job information;
first filter logic configured to process the job information when the job information conforms to the data structure and generate a first output result that conforms to the data structure;
second filter logic configured to process the job information when the job information conforms to the data structure and generate a second output result that partially conforms to the data structure; and
third filter logic configured to process the job information when the job information is arranged according to a non-structured format;
wherein the first filter logic processes the job information while maintaining the data structure specifying the job information to generate the first output result for a first target entity, the first target entity configured to recognize and process the job information when arranged according to the data structure, wherein the second filter logic processes the job information to generate the second output result for a second target entity, the second target entity configured to recognize and process the job information when arranged at least partially according to the data structure, and wherein the third filter logic processes the job information when the job information is arranged according to a non-structured format to generate a third output result for a third target entity, the third target entity configured to recognize and process the job information when arranged according to the non-structured format.

2. The system of claim 1, wherein the logic for consuming comprises logic configured to consume at least one job node representing an entire job to be processed by the spooling module.

3. The system of claim 1, wherein the logic for consuming comprises logic configured to consume at least one document node representing a document to be processed by the spooling module.

4. The system of claim 1, wherein the logic for consuming comprises logic configured to consume at least one rendition node representing a rendition of a document to be processed by the spooling module.

5. The system of claim 1, wherein the logic for consuming comprises logic configured to consume at least one page node representing a page to be processed by the spooling module.

6. The system of claim 5, wherein the logic for consuming at least one page node consumes a fixed page node that includes markup describing rendering of the page.

7. The system of claim 1, wherein the logic for consuming comprises logic configured to consume at least one resource node representing a resource to be processed by the spooling module.

8. The system of claim 1, further comprising logic configured to determine at least one characteristic of the job information.

9. The system of claim 1, further comprising logic configured to provide a notification upon the occurrence of an event associated with the consuming of the job information.

10. The system of claim 1, wherein the logic for consuming is configured to consume the job information in a synchronous manner.

11. The system of claim 1, wherein the logic for consuming is configured to consume the job information in an asynchronous manner.

12. The system of claim 1, wherein the logic for consuming comprises a plurality of modules respectively configured to retrieve different nodes of the data structure.

13. The system of claim 1, wherein the logic for consuming comprises logic configured to consume at least one selector node that functions to select among at least two aspects of the job information.

14. The system of claim 1, wherein the logic for consuming comprises logic configured to consume at least one sequence node that functions to bind together at least two aspects of the job information.

15. The system of claim 1, wherein the logic for consuming comprises logic configured to consume at least one fixed panel node that functions to bind together at least two pages of the job information.

* * * * *